US012272865B2

(12) United States Patent
Lee et al.

(10) Patent No.: US 12,272,865 B2
(45) Date of Patent: Apr. 8, 2025

(54) ELECTRONIC DEVICE COMPRISING FLEXIBLE DISPLAY AND ANTENNA

(71) Applicant: SAMSUNG ELECTRONICS CO., LTD., Suwon-si (KR)

(72) Inventors: Kookjoo Lee, Suwon-si (KR); Sungkoo Park, Suwon-si (KR); Hyeonuk Kang, Suwon-si (KR); Dongyeon Kim, Suwon-si (KR); Yongyoun Kim, Suwon-si (KR); Gun Lim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 18/115,232

(22) Filed: Feb. 28, 2023

(65) Prior Publication Data

US 2023/0208013 A1 Jun. 29, 2023

Related U.S. Application Data

(63) Continuation of application No. PCT/KR2021/011939, filed on Sep. 3, 2021.

(30) Foreign Application Priority Data

Sep. 3, 2020 (KR) ........................ 10-2020-0112607

(51) Int. Cl.
*H01Q 1/24* (2006.01)
*H01Q 9/04* (2006.01)
(Continued)

(52) U.S. Cl.
CPC ........... *H01Q 1/243* (2013.01); *H01Q 9/0407* (2013.01); *H01Q 9/285* (2013.01); *H01Q 21/28* (2013.01)

(58) Field of Classification Search
CPC ...... H01Q 1/243; H01Q 9/0407; H01Q 9/285; H01Q 21/28; G06F 1/1652
See application file for complete search history.

(56) References Cited

U.S. PATENT DOCUMENTS 7,928,921 B2 4/2011 Kai et al.
9,964,995 B1 * 5/2018 Morrison ............... H01Q 21/30
(Continued)

FOREIGN PATENT DOCUMENTS

CN 208939134 6/2019
JP 2008-104007 5/2008
(Continued)

OTHER PUBLICATIONS

International Search Report of PCT/KR2021/011939 mailed Dec. 27, 2021, 5 pages.
(Continued)

*Primary Examiner* — Dameon E Levi
*Assistant Examiner* — Leah Rosenberg
(74) *Attorney, Agent, or Firm* — Nixon & Vanderhye P.C.

(57) ABSTRACT

An electronic device may include: a first housing, a second housing configured to slide from the first housing, a flexible display disposed to the first housing and the second housing and having a screen configured to be reduced/extended according to the sliding of the second housing, a first antenna module including at least one antenna disposed to the first housing and configured to radiate a millimeter wave, and a second antenna module including at least one antenna disposed to the second housing and configured to radiate a millimeter wave. The second antenna module may be located adjacent to one side face of the second housing and may be configured to form a beam in a same direction as the first antenna module.

16 Claims, 25 Drawing Sheets

(51) Int. Cl.

| | |
|---|---|
| ***H01Q 9/28*** | (2006.01) |
| ***H01Q 21/28*** | (2006.01) |

(56) References Cited

U.S. PATENT DOCUMENTS

| | | | | |
|---|---|---|---|---|
| 11,024,938 | B2 | 6/2021 | Moon et al. | |
| 11,252,826 | B2 | 2/2022 | Park et al. | |
| 11,470,729 | B2 | 10/2022 | Kim et al. | |
| 11,561,582 | B2 | 1/2023 | Kim et al. | |
| 2018/0316379 | A1* | 11/2018 | Chang | H01Q 1/245 |
| 2018/0366813 | A1* | 12/2018 | Kim | H01Q 9/04 |
| 2019/0261519 | A1* | 8/2019 | Park | H05K 1/118 |
| 2019/0286194 | A1 | 9/2019 | Xia et al. | |
| 2020/0014095 | A1 | 1/2020 | Mow et al. | |
| 2020/0020255 | A1 | 1/2020 | Yoon | |
| 2021/0135492 | A1 | 5/2021 | Kim et al. | |
| 2021/0328329 | A1* | 10/2021 | Kim | H04M 1/0214 |

FOREIGN PATENT DOCUMENTS

| | | |
|---|---|---|
| KR | 10-2006-0124170 | 12/2006 |
| KR | 10-1146052 | 5/2012 |
| KR | 10-1292054 | 8/2013 |
| KR | 10-2019-0086305 | 7/2019 |
| KR | 10-2019-0101184 | 8/2019 |
| KR | 20190101184 A | 8/2019 |
| KR | 10-2019-0115888 | 10/2019 |
| KR | 10-2019-0143029 | 12/2019 |
| KR | 10-2020-0022161 | 3/2020 |
| KR | 10-2020-0025439 | 3/2020 |
| KR | 20200025439 A | 3/2020 |

OTHER PUBLICATIONS

Written Opinion of the ISA of PCT/KR2021/011939 mailed Dec. 27, 2021, 4 pages.

Korean Office Action dated Sep. 2, 2024 for KR Application No. 10-2020-0112607.

* cited by examiner

810: radiation pattern of patch antenna vertically mounted in slide-close state
820: radiation pattern of patch antenna vertically mounted in slide-open state
830: radiation pattern of antenna module mounted on rear face of sliding portion 1810: antenna efficiency of slide-close
1820: antenna efficiency of slide-open
1830: antenna efficiency when antenna module is additionally disposed 2410: slide close(free)
2420: slide open(hand free)
2430: antenna efficiency when antenna module is additionally disposed

ELECTRONIC DEVICE COMPRISING FLEXIBLE DISPLAY AND ANTENNA

CROSS-REFERENCE TO RELATED APPLICATIONS

This application is a continuation of International Application No. PCT/KR2021/011939 designating the United States, filed on Sep. 3, 2021, in the Korean Intellectual Property Receiving Office and claiming priority to Korean Patent Application No. 10-2020-0112607, filed on Sep. 3, 2020, in the Korean Intellectual Property Office, the disclosures of which are incorporated by reference herein in their entireties.

BACKGROUND

Field

The disclosure relates to an electronic device including a flexible display and an antenna.

Description of Related Art

With the advance of a display technology, research and development of an electronic device including a flexible display are being actively conducted. Since the flexible display may be folded, bent, rolled, or unfolded, it is expected to significantly contribute to a decrease in volume of the electronic device or a change in a design of the electronic device.

A communication method using a high frequency band such as millimeter wave (mmWave) may provide a beamforming function using an array antenna structure for increasing an antenna gain, in order to overcome a high free space loss.

An electronic device (e.g., a slidable phone) may display a main screen in case of slide-close of a screen, and may additionally display an extended screen in case of slide-open of the screen. In case of slide-close of the electronic device (e.g., the slidable phone), a flexible display or at least part of a structure supporting the flexible display may cover one region of a rear face of the electronic device, which may result in a decrease in a region for disposing an antenna. In case of slide-open, an antenna module disposed to a main body of the electronic device (e.g., the slidable phone) is covered by the flexible display to be extended, which may result in a decrease in antenna coverage and a degradation of radio wave radiation performance.

SUMMARY

An electronic device according to various example embodiments of the disclosure may include: a first housing, a second housing configured to slide from the first housing, a flexible display disposed to the first housing and having a screen configured to be reduced/extended according to the sliding of the second housing, a first antenna module including at least one antenna disposed to the first housing and configured to radiate a millimeter wave, and a second antenna module including at least one antenna disposed to the second housing and configured to radiate a millimeter wave. The second antenna module may be located adjacent to one side face of the second housing and may be configured to form a beam in a same direction as the first antenna module.

An electronic device according to various example embodiments may include: a first housing, a second housing overlapping the first housing based on a screen of the electronic device being reduced and configured to slide from the first housing based on the screen of the electronic device being extended, a flexible display disposed to the first housing and the second housing and having a screen configured to be reduced/extended according to the sliding of the second housing, a plurality of first antenna modules including at least one antenna disposed to the first housing and configured to radiate a millimeter wave, and a second antenna module including at least one antenna disposed to the second housing overlapping with the first housing and configured to radiate a millimeter wave. The second antenna module may be located at an upper end or lower end edge portion of a rear face of the second housing.

An electronic device according to various example embodiments of the disclosure may include: a first housing, a second housing configured to slide from the first housing, a flexible display disposed to the first housing and the second housing and having a screen configured to be reduced/extended according to the sliding of the second housing, a plurality of first antenna modules including at least one antenna disposed to the first housing and configured to radiate a millimeter wave, and a second antenna module including at least one antenna disposed to the second housing overlapping with the first housing and configured to radiate a millimeter wave. The second antenna module may include a plurality of dipole antennas configured to radiate a millimeter wave toward a side face of the electronic device and a plurality of patch antennas configured to radiate a millimeter wave toward a rear face of the electronic device.

According to various example embodiments of the disclosure, in case of slide-open of an electronic device (e.g., a slidable phone), wider antenna coverage may be secured due to a movement of a second housing, and radiation efficiency of a radio wave (e.g., a millimeter wave) may be improved.

According to various example embodiments of the disclosure, even if an antenna module disposed to a main body is covered by a user in case of the slide-open of the electronic device (e.g., the slidable phone), an antenna module disposed to the second housing may be used to secure wide antenna coverage and improve radiation efficiency of the radio wave (e.g., the millimeter wave).

In addition thereto, various effects which are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to the description of the drawings, the same or similar reference numerals may be used to refer to the same or similar elements.

DETAILED DESCRIPTION

Hereinafter, various example embodiments will be described in greater detail with reference to the accompanying drawings.

Figure 1:
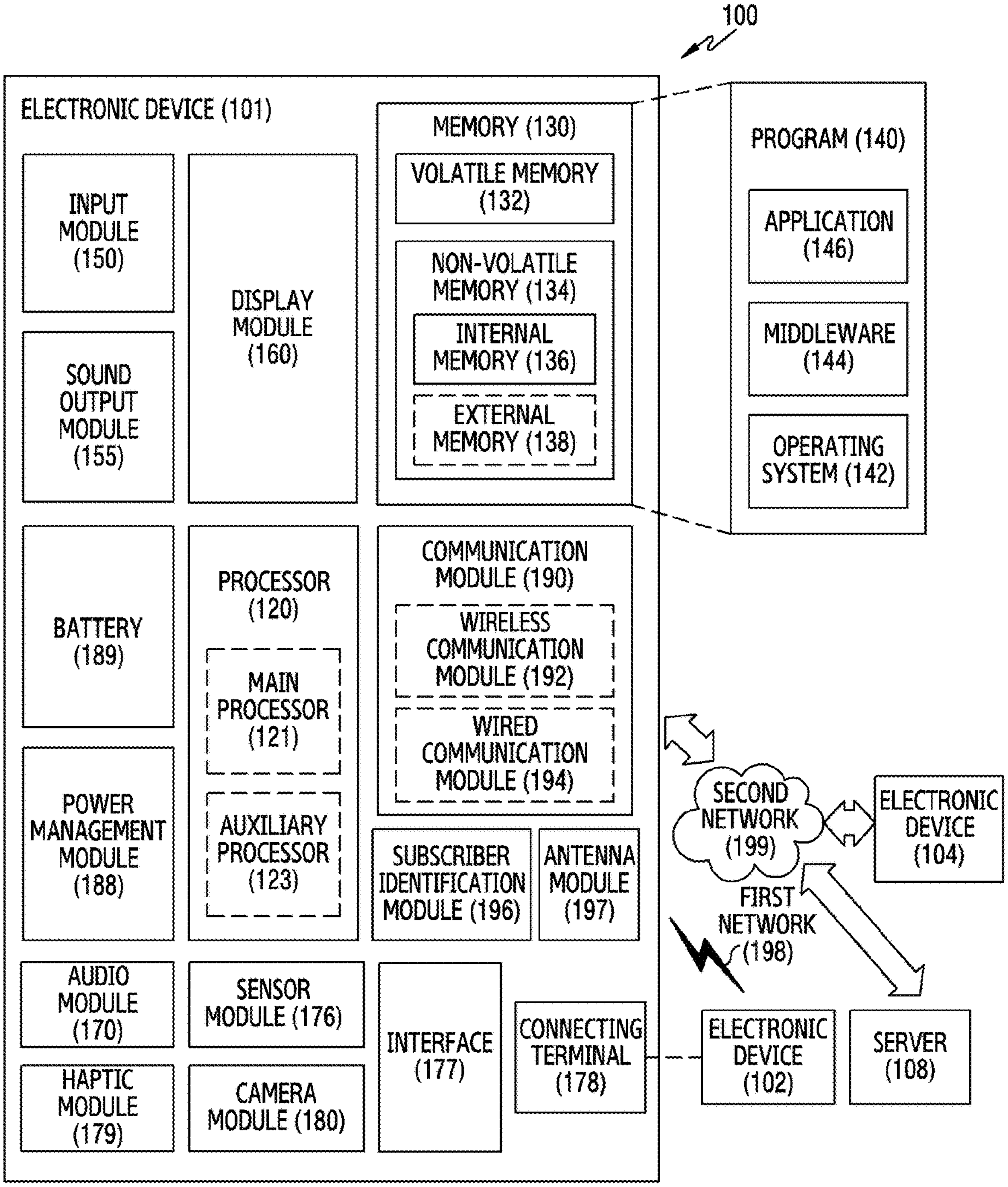
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device (e.g., the electronic device 101 of FIG. 1, an electronic device 200 of FIG. 2) according to various example embodiments of the disclosure may include: a first plate (e.g., a first plate 201 of FIG. 2) facing a first direction and a second plate (e.g., a second plate 203 of FIG. 2) facing a second direction opposite to the first direction. The electronic device (e.g., the electronic device 101 of FIG. 1, the electronic device 200 of FIG. 2) may include a housing including a space between a first plate and the second plate, a first side member (e.g., a first housing 221 of FIG. 2) surrounding part of the space, a second side member (e.g., a second housing 223 of FIG. 2) surrounding another part of the space at one side of the first housing and movable toward the side of the first housing, a width-adjustable flexible display (e.g., the display module 160 of FIG. 1) visible through the first plate 201 which is made visible based on a movement of the second housing 223, and a wireless communication circuit (e.g., the communication module 190 of FIG. 1) configured to transmit and receive a radio frequency (RF) signal. The electronic device (e.g., the electronic device 101 of FIG. 1, the electronic device 200 of FIG. 2) according to various embodiments of the disclosure may further include a flexible display 210 (e.g., a flexible display 310), a processor (e.g., the processor 120 of FIG. 1) electrically coupled to a wireless communication circuit, and a printed circuit board (e.g., a main printed circuit board 370) on which the processor 120 and the wireless communication circuit are disposed.

Figure 2:
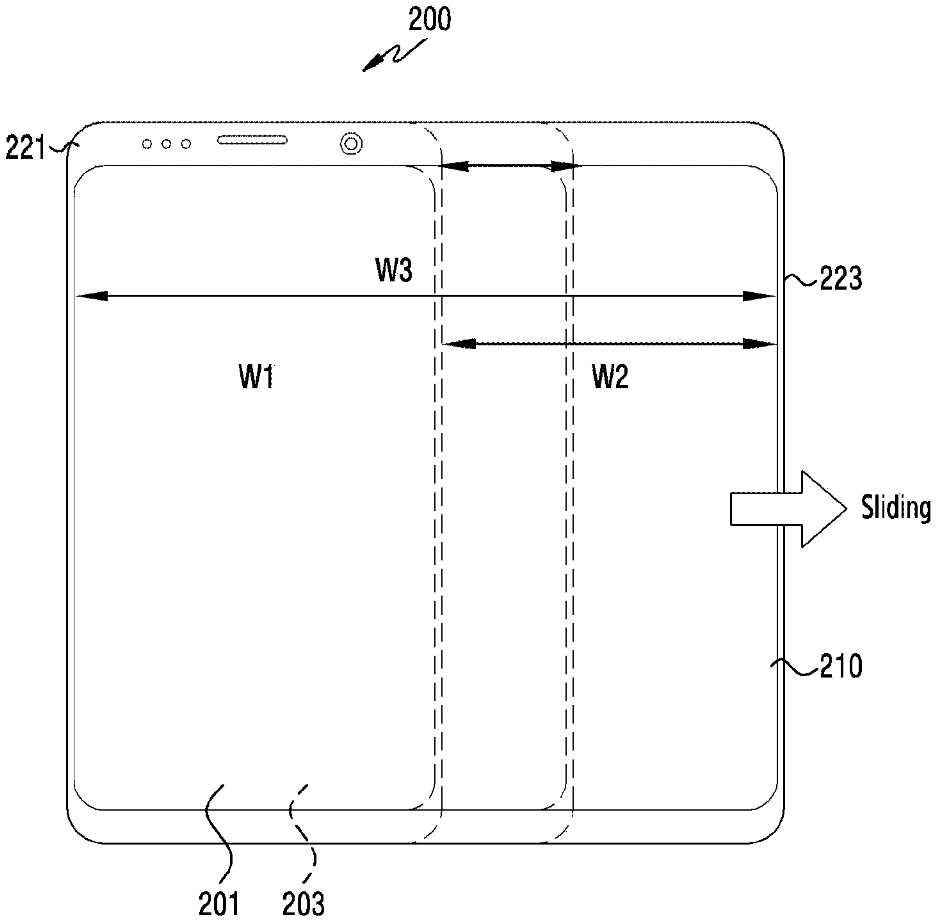
FIG. 2 is a diagram illustrating an example shape in which an electronic device extends a display according to various embodiments.

FIG. 2 is a diagram illustrating an example shape in which an electronic device 200 extends a display 210 according to various embodiments.

Referring to FIG. 2, the electronic device 200 (e.g., the electronic device 101 of FIG. 1) according to an embodiment of the disclosure may include a first plate 201 facing a first direction (e.g., a front face) and a second plate 203 facing a second direction (e.g., a rear face) opposite to the first direction. The electronic device 200 (e.g., the electronic device 101 of FIG. 1) may include housings 221 and 223 providing a space between the first plate 201 and the second plate 203 and/or the flexible display 210 (e.g., the display module 160 of FIG. 1) exposed through the first plate 201.

Figure 3:
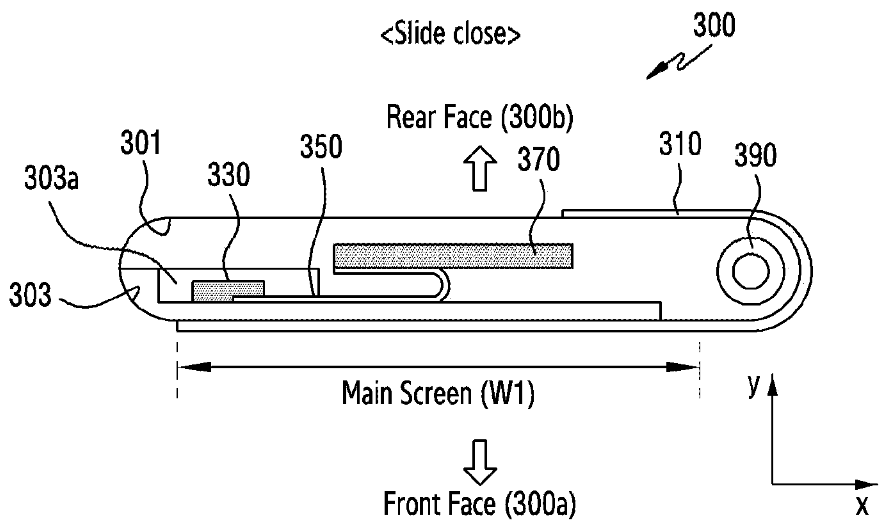
FIG. 3 is a cross-sectional view illustrating a slide-close (e.g., a display-reduced) state of an electronic device according to various embodiments.

According to an embodiment, the electronic device 200 may include the first housing 221 (e.g. a first housing 301 of FIG. 3) and the second housing 223 (e.g., a second housing 303 of FIG. 3).

According to an embodiment, the first housing 221 may be fixed, and the second housing 223 may be movable in a sliding manner. For example, the second housing 223 may be constructed slidably toward one side of the first housing 221. According to an embodiment, the second housing 223 may move by up to a second width W2 toward the side of the first housing 221, According to an embodiment, the display 210 may be flexible, and a width of a region exposed to the outside may be adjusted based on a movement of the second housing 223. For example, at least a portion of the display 210 may be visible usually to have a first width W1. Another portion of the display 210 may be visible by being further extended by up to the second width W2 when the second housing 223 moves in the sliding manner. For example, the display 210 may be visible with a third width W3 by being extended from the first width W1 to the second width W2.

When the display 210 does not slide and thus is exposed with the first width W1, this may be defined as a slide-close state (e.g., a display-reduced state). When the display 210 slides and thus is visible with the third width W3, this may be defined as a slide-open state (e.g., a display-extended state). For example, the third width W3 may be obtained by adding the second width W2 to the first width W1.

Figure 4:
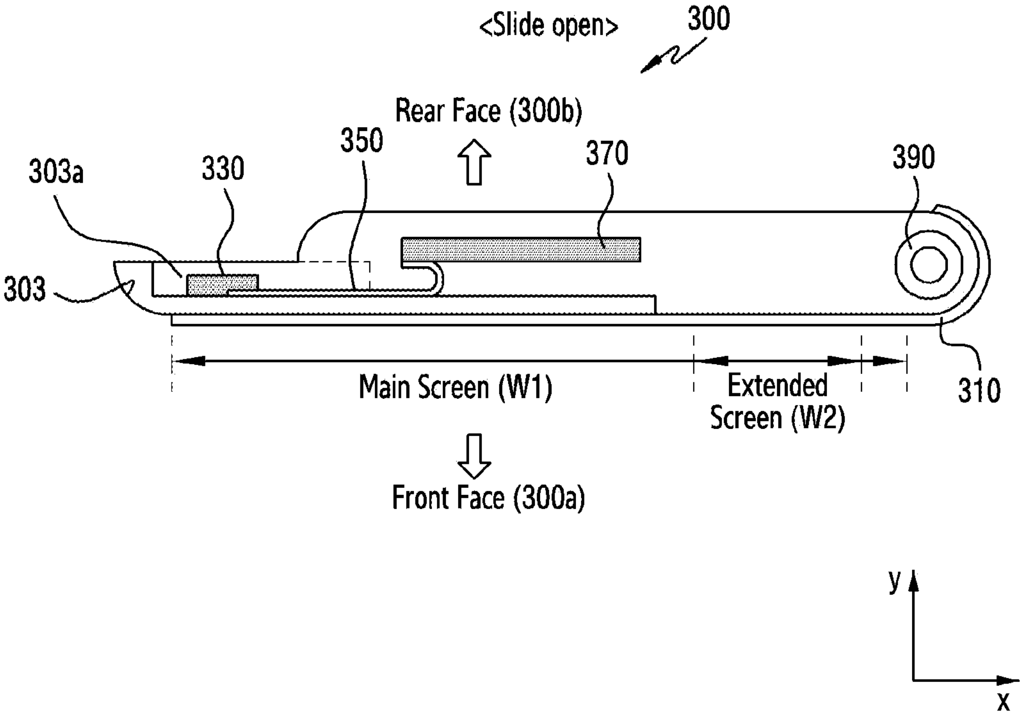
FIG. 4 is a cross-sectional view illustrating a slide-open (e.g., a display-extended) state of an electronic device according to various embodiments.
Figure 5:
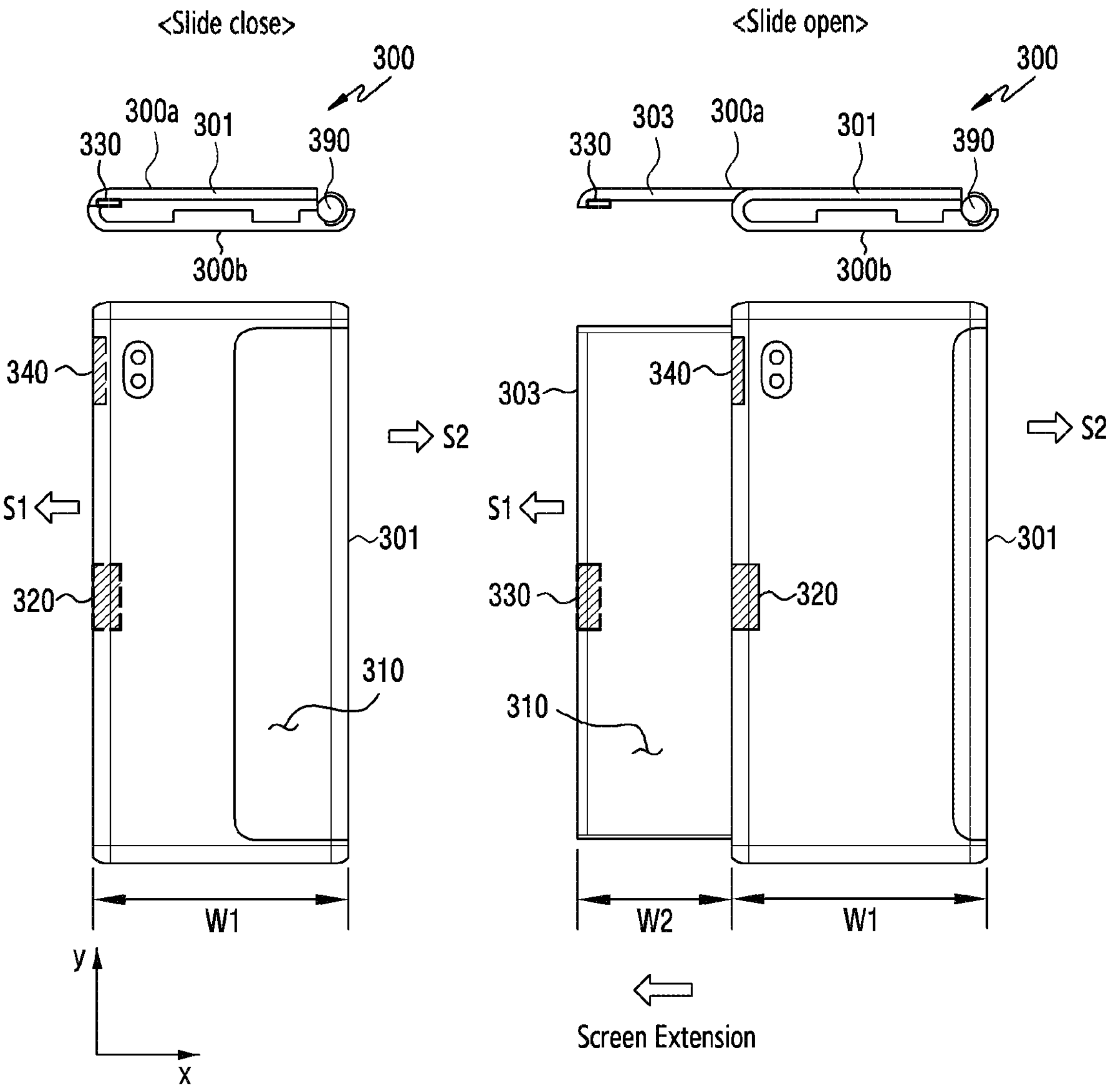
FIG. 5 is a diagram illustrating an example in which antenna modules are disposed to a rear face of an electronic device according to various embodiments.

FIG. 3 is a cross-sectional view illustrating a slide-close (e.g., a display-reduced) state of an electronic device according to various embodiments. FIG. 4 is a diagram illustrating a slide-open (e.g., a display-extended) state of an electronic device according to various embodiments. FIG. 5 is a diagram illustrating an example in which antenna modules are disposed to a rear face 300*b* of an electronic device 300 according to various embodiments.

In FIG. 3 and FIG. 4, the electronic device 300 (e.g., the electronic device 101 of FIG. 1, the electronic device 200 of FIG. 2) is disposed such that a front face 300*a* (e.g., a front face 300*a* of FIG. 5) on which a screen thereof is displayed faces a downward direction (e.g., a −y-axis direction) and the rear face 300*b* (e.g., a rear face 300*b* of FIG. 5) of the electronic device 300 faces an upward direction (e.g., a +y-axis direction). The rear face 300*b* of the electronic device 300 in the slide-close (e.g., the display-reduced) state is illustrated in a left side of FIG. 5. The rear face 300*b* of the electronic device 300 in the slide-open (e.g., the display-extended) state is illustrated in a right side of FIG. 5. For example, in case of the slide-open, a display 310 may slide in a first direction of an x-axis (e.g., a −x-axis direction) to extend the screen. As another example, in case of the slide-close, the display 310 may slide in a second direction of the x-axis (e.g., a +x-axis direction) to reduce the screen.

Referring to FIG. 3, FIG. 4 and FIG. 5, the electronic device 300 (e.g., the electronic device 101 of FIG. 1, the electronic device 200 of FIG. 2) may include a first housing (e.g., a first housing 301 of FIG. 3), a second housing (e.g., a second housing 303 of FIG. 3), the display 310, a first antenna module 320, a second antenna module 330, a third antenna module 340, a flexible printed circuit board (FPCB) 350, a printed circuit board 370, and/or a hinge structure 390.

According to an embodiment, the first housing 301 may include the display 310, the first antenna module 320, the third antenna module 340, the FPCB 350, the printed circuit board 370, the hinge structure 390, and/or a battery (e.g., the battery 189 of FIG. 1). The first housing 301 may include a metal material. For example, at least part of a first side member included in the first housing 301 may be constructed of metal, and may be used as an antenna (not shown) radiator. As another example, a laser direct structuring (LDS) pattern constructed on part of a rear face of the first housing 301 or an antenna carrier may be used as an antenna. As an example, the LDS pattern may be constructed on the part of the rear face of the first housing 301 or the antenna carrier, and the LDS pattern may be used as the antenna radiator.

According to various embodiments, a width of the display 310 (e.g., the display module 160 of FIG. 1, the display 210 of FIG. 2), which is exposed to the outside, may be adjusted based on a movement of the second housing 303. According to various embodiments, the display 310 may include a display panel and a control circuit (not shown). For example, the display panel may be a flexible display panel (e.g., an organic light emitting diode (OLED) panel). The display panel may include a plurality of pixels to display an image, and one pixel may include a plurality of sub-pixels. As an embodiment, one pixel may include three colors of red sub-pixels, green sub-pixels, and blue sub-pixels. As an embodiment, one pixel may include four colors of red sub-pixels, green sub-pixels, blue sub-pixels, and white sub-pixels. As an embodiment, one pixel may be constructed in an RGBG pentile manner, including one red sub-pixel, two green sub-pixels, and one blue sub-pixel. According to an embodiment, the control circuit may include a printed circuit board and a display driver IC (DDI) (not shown).

According to an embodiment, the display 310 may include a touch display driver IC (TDDI) (not shown) for driving a touch pattern (not shown).

Referring to FIG. 3 and FIG. 4, the hinge structure 390 may be coupled to the display 310. For example, the hinge structure 390 may include a hinge shaft and/or a multi-link hinge, and the multi-link hinge may move by a rotation of the hinge shaft. For example, when the hinge shaft rotates in a first direction, the multi-link hinge may move in the first direction to extend the display 310. When the hinge shaft rotates in a second direction which is opposite to the first direction, the multi-link hinge may move in the second direction to reduce the display 310.

Figure 9:
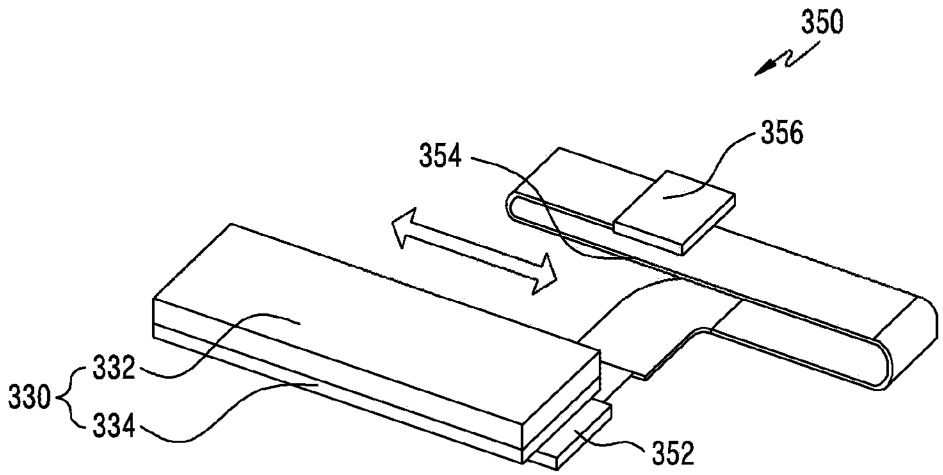
FIG. 9 perspective view illustrating an example of a flexible printed circuit board (FPCB) for sliding of a display of an electronic device according to various embodiments.

According to an embodiment, the first antenna module 320, the second antenna module 330, or the third antenna module 340 may include a printed circuit board, at least one antenna array (e.g., an antenna array 332 of FIG. 9) constructed of a plurality of antennas, or a wireless communication circuit (e.g., an RFIC 334 of FIG. 9). The plurality of antennas may include various antennas such as a patch antenna or a dipole antenna, for example, according to a direction of a beam to be formed or a method of disposing the antennas to the electronic device 300.

In an embodiment, the first antenna module 320 or the third antenna module 340 may include an antenna array including a plurality of patch antennas. For example, the first antenna module 320 may be disposed such that a rear face and the plurality of patch antennas are substantially parallel to form a beam toward the rear face. As another example, the third antenna module 340 may be disposed such that the rear face and the plurality of patch antennas are substantially perpendicular to form a beam toward a side face. As another example, the second antenna module 330 may include an antenna array configured to form a beam toward the rear face or an antenna array configured to form a beam toward the side face.

In an embodiment, a wireless communication circuit (e.g., an RFIC) of the first antenna module 320 may be electrically coupled to the printed circuit board 370 through a signal line or an FPCB. A wireless communication circuit of the second antenna module 330 may be electrically coupled to the printed circuit board 370 through the FPCB 350. A wireless communication circuit of the third antenna module 340 may be electrically coupled to the printed circuit board 370 through the signal line or the FPCB.

As an example, in case of transmission, a wireless communication circuit (e.g., the RFIC 334 of FIG. 9) may convert an intermediate frequency signal to a radio frequency (RF) signal (e.g., a mmWave band signal) used in a first network (e.g., a legacy network) and/or a second network (e.g., a 5G network). In case of reception, the wireless communication circuit (e.g., the RFIC 334 of FIG. 9) may preprocess the received RF signal (e.g., the mmWave band signal). For example, the wireless communication circuit may convert the RF signal to the intermediate frequency signal.

As an example, in case of transmission, an RFIC included in the antenna module may include an RF frontend, and may convert the RF signal or the intermediate frequency signal to a base band (BB). An intermediate frequency integrated circuit (IFIC) may be disposed to convert a signal output from a CP so that the IFIC converts an intermediate frequency (IF) signal. The RFIC may convert the IF signal to the RF signal, and an antenna may radiate the RF signal. In case of reception, the RFIC may convert the received RF signal to the IF signal and deliver it to the IFIC, and the IFIC may convert the IF signal to the BB and deliver it to the CP.

As an example, the FPCB 350 may be bent according to the slide-open and the slide-close, and may include signal lines and ground lines to transmit an RF signal. For example, the FPCB 350 may include a coplanar waveguide (CPW) structure. A first shaft of the FPCB 350 may be electrically coupled to the second antenna module 330, and a second shaft may be electrically coupled to the printed circuit board 370.

Figure 6:
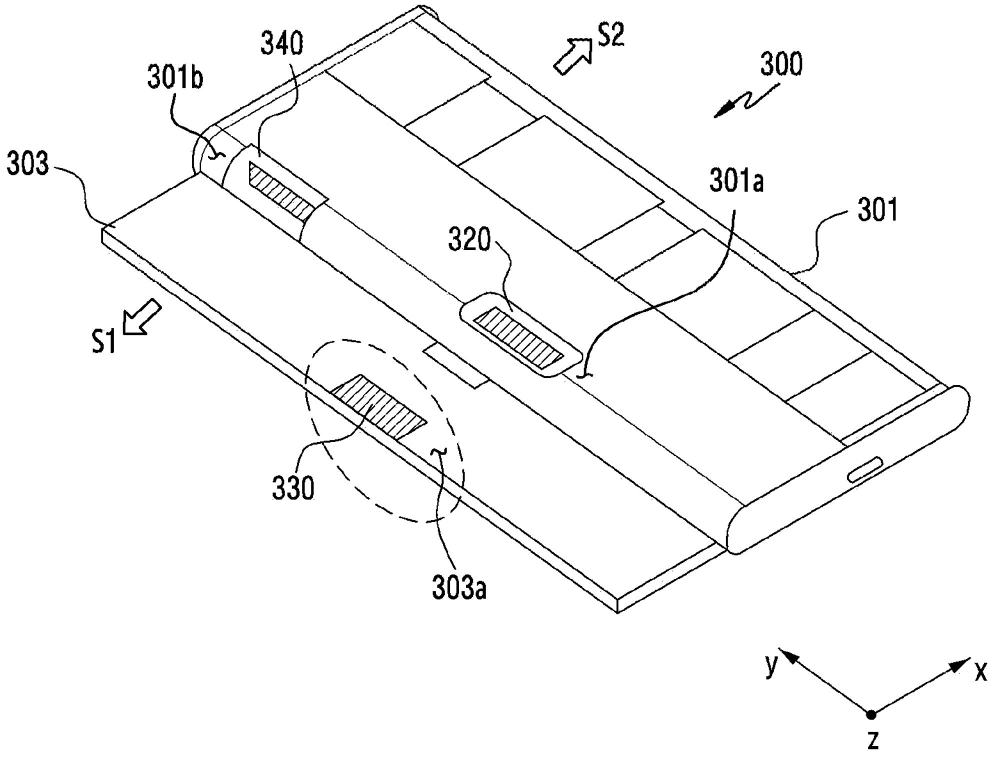
FIG. 6 is a perspective view illustrating antenna modules disposed to a rear face in a slide-open (e.g., a display-extended) state of an electronic device according to various embodiments.

FIG. 6 is a perspective view illustrating antenna modules disposed to a rear face 300*b* in a slide-open (e.g., a display-extended) state of an electronic device 300 according to various embodiments.

Referring to FIG. 6, according to various embodiments, a first antenna module 320 and a third antenna module 340 may include a plurality of antennas radiating a frequency of a millimeter wave (mmWave) band. The first antenna module 320 may be disposed to form a beam toward a rear face 301*a* (e.g., an opposite direction of a display 310) of a main body (e.g., a first housing 301) of the electronic device 300. For example, the first antenna module 320 may be disposed substantially parallel to a first direction (e.g., an X-axis) on the rear face 301*a* of the first housing 301. For instance, when the first antenna module 320 includes a plurality of patch antennas, the first antenna module 320 may radiate a radio wave (e.g., mmWave) toward a rear face (e.g., the rear face 300*b* of FIG. 3) of the electronic device 300. According to various embodiments, the third antenna module 340 may include a plurality of antennas which radiate a frequency of the mmWave band. The third antenna module 340 may be disposed to form a beam toward the side face 301*b* (e.g., the second housing 223 of FIG. 2) of the first housing 301 of the electronic device 300. The third antenna module 340 may be adjacent to the side face 301*b* of the first housing 301, and may be disposed parallel to a z-axis direction on the side face 301*b* of the first housing 301. For instance, when the third antenna module 340 includes a plurality of patch antennas, the third antenna module 340 may radiate a radio wave (mmWave) toward a side face (e.g., a −x-axis direction) of the electronic device 300. For example, the first antenna module 320 and the third antenna module 340 may be disposed in substantially orthogonal directions.

According to various embodiments, a second housing 303 may include a metal material. In case of slide-open, the second housing 320 may move from the first housing 301. A portion of the display 310, the second antenna module 330, and/or a portion of the FPCB 350 may be disposed to the second housing 303. In case of the slide-open, the second antenna module 330 may be disposed to the second housing 303 so as not to overlap with the first housing 301, when viewed from above the display 310.

As an example, in order to prevent and/or reduce a stepped difference from occurring when the second antenna module 330 is disposed to the second housing 303, a groove having a specific depth may be constructed on a rear face 303*a* of the second housing 303, and the second antenna module 330 may be disposed to the groove. For example, the groove constructed in the second housing 303 may have the same depth as a thickness of the second antenna module 330 or a greater depth than the thickness of the second antenna module 330. An upper face of the second antenna module 330 may be located to be identical to the rear face 303*a* of the second housing 303 or to be lower than the upper face of the second housing 303. As such, since the second antenna module 330 is disposed to the groove constructed in the second housing 303, the second antenna module 330 may not be caught at the first housing 301 in case of the slide-open and slide-close.

According to an embodiment, a wireless communication circuit (e.g., an RFIC) may be electrically coupled to the second antenna module 330. The wireless communication circuit (e.g., the RFIC) may be directly coupled to the second antenna module 330, or may be coupled through a separate connection means (e.g. an FPCB). The wireless communication circuit (e.g., the RFIC) may be electrically coupled to a printed circuit board 370 through an FPCB 350.

According to an embodiment, the first antenna module 320, the second antenna module 330, or the third antenna module 340 may transmit and/or receive a signal having a frequency greater than or less than about 3 GHz and less than or equal to about 100 GHz.

According to various embodiments, the printed circuit board 370 (e.g., the printed circuit board 370 of FIG. 3) may be coupled to a battery (e.g., the battery 189 of FIG. 1). For example, as a device for supplying power to at least one element of the electronic device 300, the battery 189 may include a non-rechargeable primary battery, a rechargeable secondary battery, or a fuel cell. According to an embodiment, the battery 189 may be integrally disposed inside the electronic device 300 (e.g., the electronic device 200 of FIG. 2), and may be disposed to be detachable from the electronic device 300 (e.g., the electronic device 200 of FIG. 2).

According to various embodiments, components such as a processor (e.g., the processor 120 of FIG. 1), a memory (e.g., the memory 130 of FIG. 1), and/or an interface (e.g., the interface 177 of FIG. 1) may be located on the printed circuit board 370. According to an embodiment, the processor 120 may include, for example, one or more of a central processing unit, an application processor, a graphic processing unit, an image signal processor, a sensor hub processor, and a communication processor. According to an embodiment, the memory 130 may include, for example, a volatile memory or a non-volatile memory. According to an embodiment, the interface 177 may include a high definition multimedia interface (HDMI), a universal serial bus (USB) interface, a secure digital (SD) card interface, and/or an audio interface. According to an embodiment, the interface 177 may electrically or physically couple the electronic device 300 and an external electronic device (not shown), and may include a USB connector, an SD card/MMC connector, or an audio connector.

Figure 7:
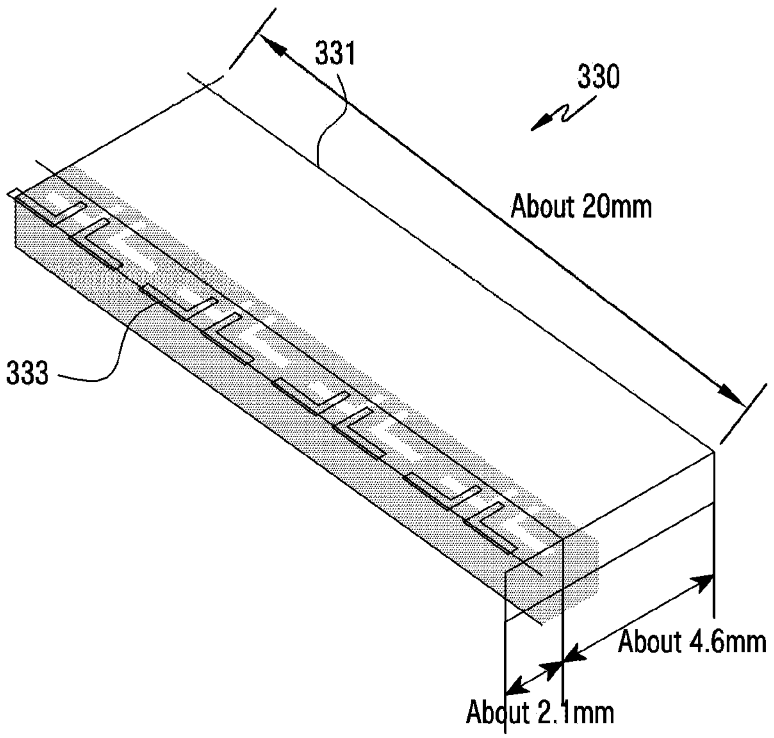
FIG. 7 is a perspective view illustrating a second antenna module located at a rear face of a second housing of an electronic device according to various embodiments.

FIG. 7 is a perspective view illustrating a second antenna module 330 located at a second housing (e.g., the second housing 303 of FIG. 6) of an electronic device 300 according to various embodiments.

Referring to FIG. 6 and FIG. 7, according to various embodiments, the second antenna module 330 may include a plurality of antennas 333 which radiate a frequency of a mmWave band. For example, the plurality of antennas 333 may be constructed by patterning conductive lines on a substrate 331. For example, the plurality of antenna 333 may include a dipole antenna. In an embodiment, the second antenna module 330 may have a length of about 20 mm and a width of about 6.7 mm. The plurality of antennas 333 may be disposed along a lengthwise direction within a width of about 2.1 mm, and may construct one array antenna. However, without being limited thereto, the plurality of antennas 333 of the second antenna module 330 may include a tapered slot antenna or a parallel plate waveguide antenna.

According to an embodiment, the second antenna module 330 may be located at the second housing 303 of the electronic device 300, and may be disposed to correspond to a rear face of the display 310. The second antenna module 330 may be disposed substantially parallel to a first direction (e.g., an x-axis) on the rear face 303*a* of the second housing 303. The second antenna module 330 may radiate a radio wave (e.g., mmWave) toward a side face (e.g., a −x-axis direction) of the electronic device 300. For example, the second antenna module 330 may form a beam toward the side face using the plurality of antennas 333.

In FIG. 5 and FIG. 6, in case of a slide-close (e.g., a screen-reduced) state of the electronic device 300, when viewed from above the display 310, it is illustrated, for example, that the first antenna module 320 and the second antenna module 330 are disposed to overlap at least in part. However, without being limited thereto, in case of the slide-close (e.g., the screen-reduced) state of the electronic device 300, the second antenna module 330 may be disposed at a location not overlapping with the first antenna module 320.

Referring to FIG. 5, according to various embodiments, in the slide-close (e.g., the display-reduced) state, the second antenna module 330 may be located between the first housing 301 and the display 310. In a slide-open (e.g., a display-extended) state, when viewed from above the display 310, the second antenna module 330 may be located not to overlap with the first housing 301.

As an embodiment, the second antenna module 330 may operate when the electronic device 300 is in the slide-open (e.g., the display-extended) state, and may not operate when in the slide-close (e.g., the display-reduced) state. As another example, the third antenna module 340 may not operate when the electronic device 300 is in the slide-open (e.g., the display-extended) state, and may operate when in the slide-close (e.g., the display-reduced) state. However, without being limited thereto, the second antenna module 330 may operate in both cases where the electronic device 300 is in the slide-open (e.g., the display-extended) state and in the slide-close (e.g., the display-reduced) state.

Figure 8:
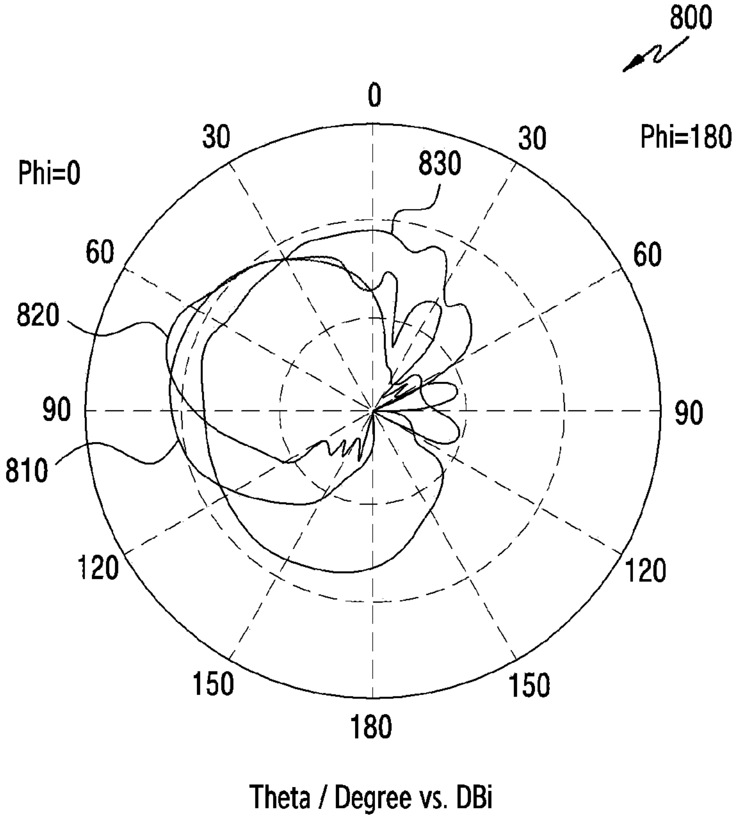
FIG. 8 is a graph illustrating a millimeter wave (mmWave) radiation pattern of an electronic device according to various embodiments.

FIG. 8 is a diagram 800 illustrating a mmWave radiation pattern of the electronic device 300 according to various embodiments.

Referring to FIG. 6, FIG. 7 and FIG. 8, in a slide-close (e.g., a screen-reduced) state, a radiation pattern 830 of the second antenna module 330 has a wider coverage than a radiation pattern 810 of the third antenna module 340 disposed to form a beam toward the side face 301*b* of the first housing 301. In addition, in a slide-open (e.g., a screen-extended) state, the radiation pattern 830 of the second antenna module 330 has a wider coverage than a radiation pattern 820 of the third antenna module 340 disposed toward the side face 301*b* of the first housing 301.

As such, the second antenna module 330 including the plurality of antennas 333 may be disposed to the second housing 303, thereby increasing a coverage of mmWave in the slide-open (e.g., the screen-extended) state. For example, when the second antenna module 330 is added together with the first antenna module 320 and the third antenna module 340, the coverage of mmWave may be increased in the slide-open (e.g., the screen-extended) state.

FIG. 9 is a diagram illustrating an example of an FPCB 350 for sliding of the second housing 303 of the electronic device 300 according to various embodiments.

Referring to FIG. 3, FIG. 4, and FIG. 9, the FPCB 350 may include a first side 352, a second side 356, and a flexible body 354 (e.g., a slide driver) located between the first side 352 and the second side 356. The flexible body 354 (e.g., the slide driver) may have a length corresponding to a movement of the second housing 303 and corresponding to a length (e.g., a second width W2) of an extended screen of the display 310. The flexible body 354 may be bent, for example, once or several times.

In an embodiment, the first side 352 of the FPCB 350 may be electrically coupled to an RFIC 334. As another example, an antenna array 332 may be disposed to a printed circuit board included in the second antenna module 330. The first side 352 of the FPCB 350 may be electrically coupled to the printed circuit board included in the second antenna module 330. The second side 356 of the FPCB 350 may be electrically coupled to the printed circuit board 370. In an embodiment, the printed circuit board included in the second antenna module 330 may be electrically coupled directly to a wireless communication circuit (e.g., an RFIC), or may be electrically coupled using a separate connection means (an FPCB).

In an embodiment, in case of slide-open (e.g., screen-extended) of the electronic device 300, the flexible body 354 (e.g., the slide driver) in a bent state is unfolded so that the second housing 303 and the second antenna module 330 move in a first direction by less than or equal to a length (e.g., the second width W2) of an extended screen, and the display 310 may be extended. As another example, in case of slide-close (e.g., screen-reduced) of the electronic device 300, the flexible body 354 (e.g., the slide driver) in an unfolded state is bent so that the second housing 303 and the second antenna module 330 may move in a second direction, and the display 310 may be reduced.

Figure 10:
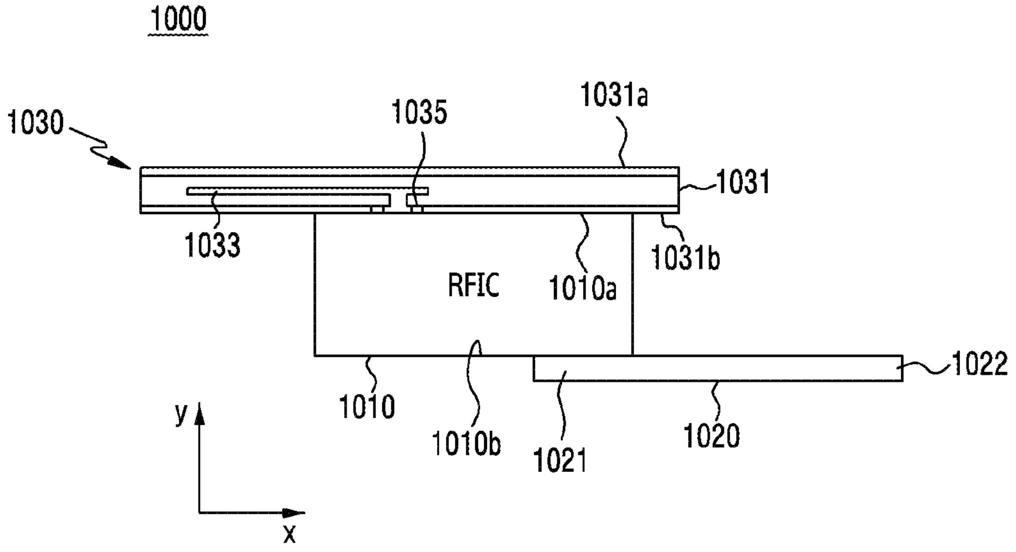
FIG. 10 is a diagram illustrating a connection structure of a second antenna module, radio frequency integrated circuit (RFIC), and FPCB of an electronic device according to various embodiments.

FIG. 10 is a diagram 1000 illustrating a connection structure of a second antenna module 1030, RFIC 1010, and FPCB 1020 of an electronic device (e.g., the electronic device 300 of FIG. 3 and FIG. 4) according to various embodiments.

Referring to FIG. 10, the electronic device (e.g., the electronic device 300 of FIG. 3 and FIG. 4) according to various embodiments may include the second antenna module 1030, the FPCB 1020, and/or a printed circuit board (e.g., the printed circuit board 370 of FIG. 3 and FIG. 4).

According to an embodiment, the second antenna module 1030 may include a substrate 1031, a plurality of antennas 1033 (e.g., a dipole antenna), a plurality of antenna feeding lines 1035 coupling the plurality of antenna 1033 and the RFIC 1010, or the RFIC 1010 electrically coupled to the plurality of antenna feeding lines 1035.

In an embodiment, a first face 1031*a* of the substrate 1031 may be disposed toward a rear face (e.g., the rear face 300*b* of FIG. 3, a +y axis direction) of the electronic device (e.g., the electronic device 300 of FIG. 3 and FIG. 4), and a second face 1031*b* of the substrate 1031 may be disposed toward a front face (e.g., the front face 300*a* of FIG. 3, a −y axis direction) of the electronic device (e.g., the electronic device 300 of FIG. 3 and FIG. 4). The RFIC 1010 may be disposed to the second face 1031*b* of the substrate 1031. For example, the second face 1031*b* of the substrate 1031 may be disposed to be in contact with a first face 1010*a* (e.g., an upper face) of the RFIC 1010, and the plurality of antenna feeding lines 1035 may be electrically coupled to the RFIC 1010. Accordingly, the plurality of antennas 1033 (e.g., a dipole antenna) and the RFIC 1010 may be electrically coupled.

According to an embodiment, a first side 1021 of the FPCB 1020 (e.g., the FPCB 350 of FIG. 9) may be electrically coupled to a second face 1010*b* (e.g., a lower face) of the RFIC 1010, and the RFIC 1010 may be electrically coupled to the FPCB 1020 (e.g., the FPCB 350 of FIG. 9). A second side 1022 of the FPCB 1020 (e.g., the FPCB 350 of FIG. 9) may be electrically coupled to a printed circuit board (e.g., a printed circuit board 370 of FIG. 3 and FIG. 4). Accordingly, the RFIC 1010 may be electrically coupled to the printed circuit board (e.g., the printed circuit board 370 of FIG. 3 and FIG. 4). As another example, the first side 1021 of the FPCB 1020 (e.g., an FPCB 350 of FIG. 9) may be electrically coupled to the substrate 1031.

As an embodiment, the substrate 1031 of the second antenna module 1030 may have a thickness of about 0.2 mm. The RFIC 1010 may have a thickness of about 1.0 mm. The FPCB 1020 may have a thickness of about 0.15 mm to about 2.0 mm.

As such, the RFIC 1010 may be electrically coupled directly to the substrate 1031, and the RFIC 1010 may be electrically coupled to a printed circuit board (e.g., the printed circuit board 370 of FIG. 3 and FIG. 4) using the FPCB 1020 (e.g., the FPCB 350 of FIG. 9). Since the FPCB 1020 (e.g., the FPCB 350 of FIG. 9) is disposed between the RFIC 1010 and the printed circuit board (e.g., the printed circuit board 370 of FIG. 3 and FIG. 4), the RFIC 1010 may be electrically coupled to the printed circuit board in case of slide-open (e.g., display-extended) and slide-close (e.g., display-reduced) of the electronic device (e.g., the electronic device 300 of FIG. 5).

According to an embodiment, the second antenna module 330 and the printed circuit board (e.g., the printed circuit board 370 of FIG. 3 and FIG. 4) may be electrically coupled using a connection member other than the FPCB 1020. For example, the second antenna module 330 and the printed circuit board may be coupled using a coaxial cable.

Figure 11:
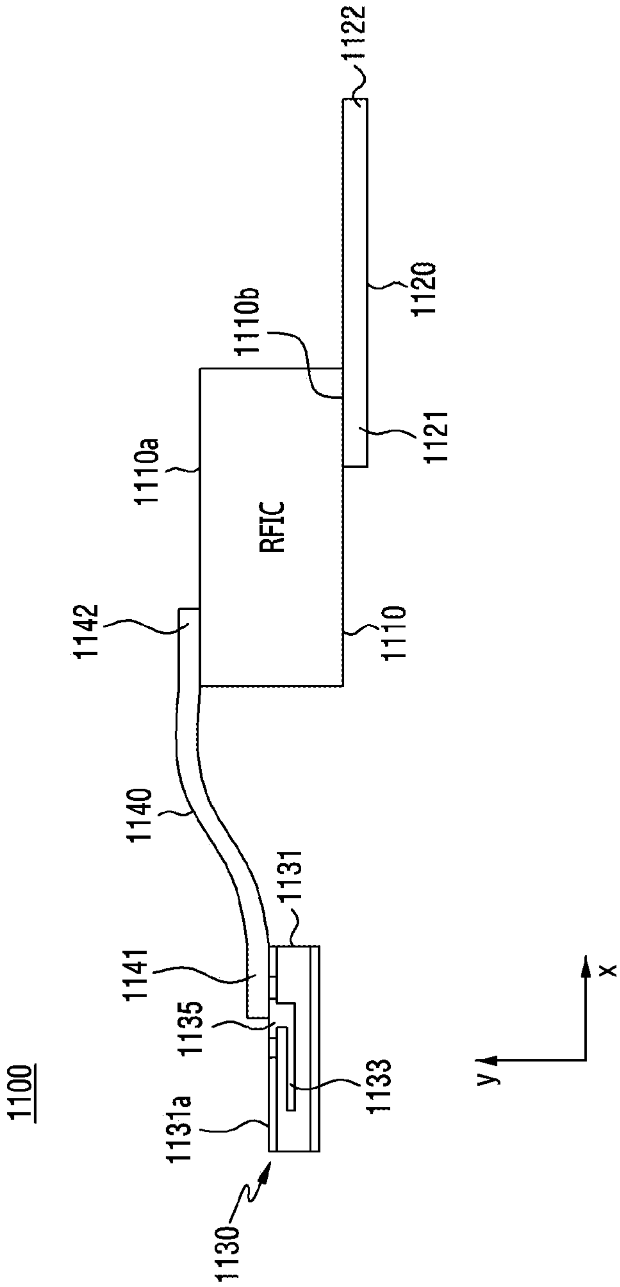
FIG. 11 is a diagram illustrating a connection structure of a second antenna module, RFIC, first FPCB, and/or second FPCB of an electronic device according to various embodiments.

FIG. 11 is a diagram 1100 illustrating a connection structure of a second antenna module 1130, RFIC 1110, first FPCB 1140, and/or second FPCB 1120 of an electronic device (e.g., the electronic device 300 of FIG. 3 and FIG. 4) according to various embodiments.

Referring to FIG. 11, the electronic device (e.g., the electronic device 300 of FIG. 3 and FIG. 4) according to various embodiments may include the second antenna module 1130, the second FPCB 1120, and/or a printed circuit board (e.g., the printed circuit board 370 of FIG. 3 and FIG. 4).

According to an embodiment, the second antenna module 1130 may include a substrate 1131, a plurality of antennas 1133 (e.g., a dipole antenna), the RFIC 1110, the first FPCB 1140, or a plurality of antenna feeding lines 1135.

In an embodiment, the substrate 1131 may be electrically coupled to the first FPCB 1140. For example, a first face 1131*a* of the substrate 1131 may be electrically coupled to a first side 1141 of the first FPCB 1140. In an embodiment, the first FPCB 1140 may be electrically coupled to the RFIC 1110. For example, a second side 1142 of the first FPCB 1140 may be electrically coupled to a first face 1110*a* (e.g., an upper face) of the RFIC 1110. Accordingly, the substrate 1131 may be electrically coupled to the RFIC 1110.

In an embodiment, the second FPCB 1120 (e.g., the FPCB 350 of FIG. 9) may be electrically coupled to the RFIC 1110. For example, a first side 1121 of the second FPCB 1120 (e.g., the FPCB 350 of FIG. 9) may be electrically coupled to a second face 1110*b* (e.g., a lower face) of the RFIC 1110. In an embodiment, the second FPCB 1120 (e.g., the FPCB 350 of FIG. 9) may be electrically coupled to a printed circuit board (e.g., the printed circuit board 370 of FIG. 3 and FIG. 4). For example, a second side 1122 of the second FPCB 1120 (e.g., the FPCB 350 of FIG. 9) may be electrically coupled to the printed circuit board (e.g., the printed circuit board 370 of FIG. 3 and FIG. 4). Accordingly, the RFIC 1110 may be electrically coupled to the printed circuit board (e.g., the printed circuit board 370 of FIG. 3 and FIG. 4).

As an embodiment, the substrate 1131 of the second antenna module 1130 may have a thickness of about 0.2 mm. The RFIC 1110 may have a thickness of about 1.0 mm. The first FPCB 1140 and the second FPCB 1120 may have a thickness of about 0.15 amm to about 2.0 mm.

According to an embodiment, since the first FPCB 1140 is disposed between the RFIC 1110 and the substrate 1131 and the second FPCB 1120 is disposed between the RFIC 1110 and the printed circuit board (e.g., the printed circuit board 370 of FIG. 3 and FIG. 4), the second antenna module 1130 may be electrically coupled to the printed circuit board in case of slide-open (e.g., display-extended) and slide-close (e.g., display-reduced) of the electronic device (e.g., the electronic device 300 of FIG. 5).

Figure 12:
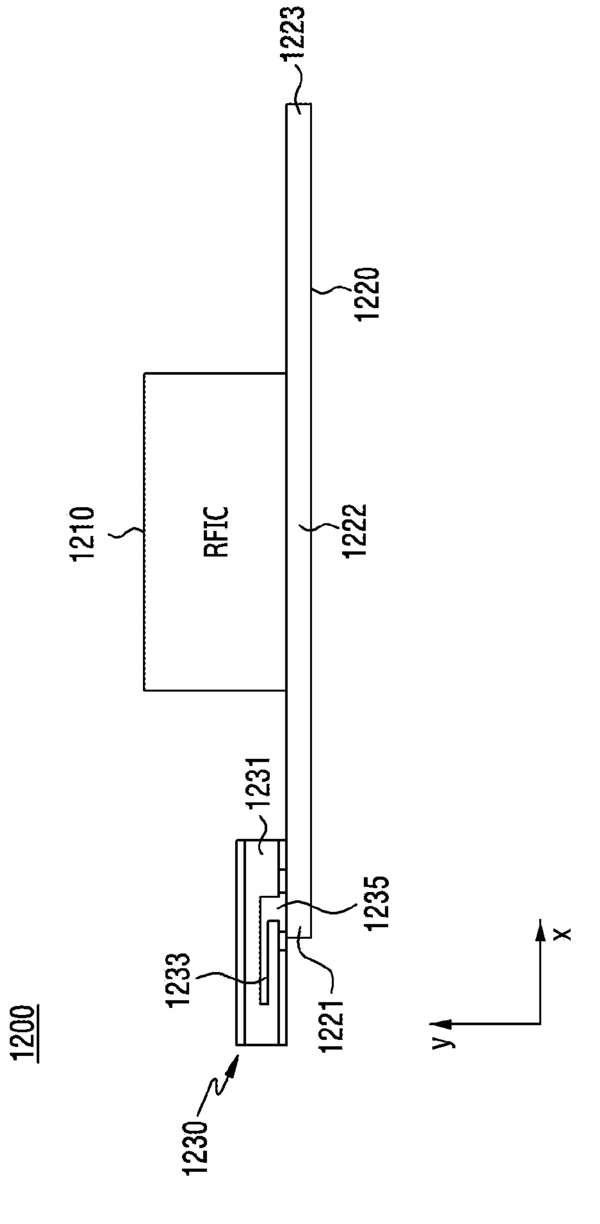
FIG. 12 is a diagram illustrating a structure of a second antenna module of an electronic device according to various embodiments.

FIG. 12 is a diagram 1200 illustrating a structure of a second antenna module 1230 of an electronic device (e.g., the electronic device 300 of FIG. 3 and FIG. 4) according to various embodiments.

Referring to FIG. 12, the electronic device (e.g., the electronic device 300 of FIG. 3 and FIG. 4) according to various embodiments may include the second antenna module 1230 and/or a printed circuit board (e.g., the printed circuit board 370 of FIG. 3 and FIG. 4).

In an embodiment, the second antenna module 1230 may include a substrate 1231, a plurality of antennas 1233 (e.g., a dipole antenna), a plurality of antenna feeding lines 1235, an RFIC 1210, or an FPCB 1220. The substrate 1231 may be electrically coupled to a first side 1221 of the FPCB 1220. In an embodiment, the RFIC 1210 may be disposed to a body portion 1222 of the FPCB 1220. For example, the body portion 1222 may be located between the first side 1221 and a second side 1223. Accordingly, the substrate 1231 may be electrically coupled to the RFIC 1210.

The second side 1223 of the FPCB 1220 may be electrically coupled to a printed circuit board (e.g., the printed circuit board 370 of FIG. 3 and FIG. 4). Accordingly, the RFIC 1210 may be electrically coupled to the printed circuit board (e.g., the printed circuit board 370 of FIG. 3 and FIG. 4).

As an embodiment, the substrate 1231 of the second antenna module 1230 may have a thickness of about 0.2 mm. The RFIC 1210 may have a thickness of about 1.0 mm. The FPCB 1220 may have a thickness of about 0.15 mm to about 2.0 mm.

Figure 13:
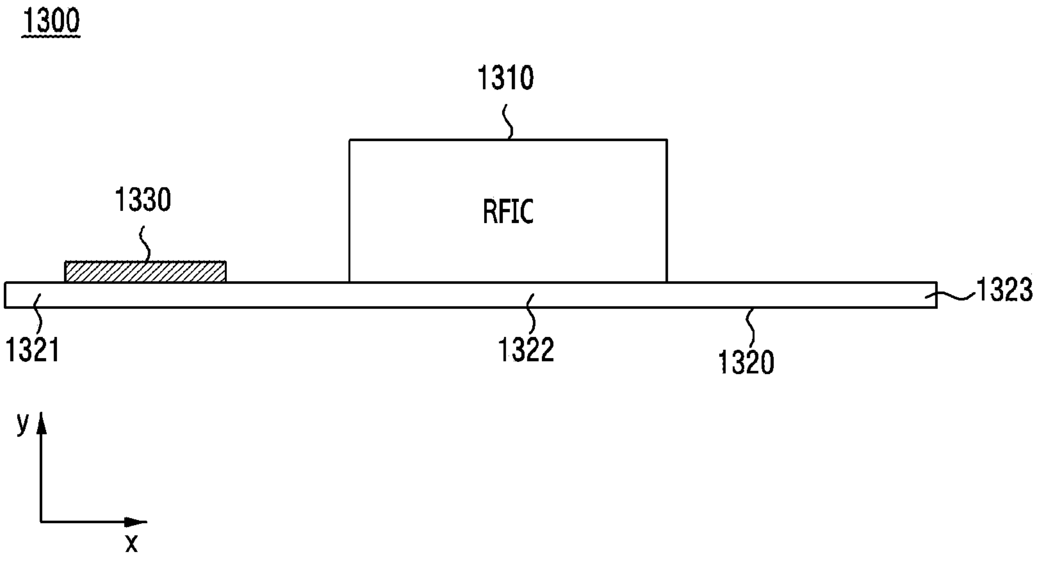
FIG. 13 is a diagram illustrating a structure of a second antenna module, RFIC, and FPCB of an electronic device according to various embodiments.

FIG. 13 is a diagram 1300 illustrating a structure of a second antenna module 1330 of an electronic device (e.g., the electronic device 300 of FIG. 3 and FIG. 4) according to various embodiments.

Referring to FIG. 13, the electronic device (e.g., the electronic device 300 of FIG. 3 and FIG. 4) according to various embodiments may include the second antenna module 1330 and a printed circuit board (e.g., the printed circuit board 370 of FIG. 3 and FIG. 4).

According to an embodiment, the second antenna module 1330 may include an FPCB 1320 or an RFIC 1310. The RFIC 1310 may be disposed to the FPCB 1320. A plurality of antennas (e.g., the plurality of antennas 1133 of FIG. 11) may be constructed on the FPCB 1320. For example, a substrate (e.g., the substrate 1131 of FIG. 11) may be replaced with the FPCB 1320.

In an embodiment, the FPCB 1320 may be electrically coupled to the printed circuit board (e.g., the printed circuit board 370 of FIG. 3 and FIG. 4). Accordingly, the RFIC 1310 may be electrically coupled to the printed circuit board (e.g., the printed circuit board 370 of FIG. 3 and FIG. 4). For example, the RFIC 1310 may be disposed to a body portion 1322 of the FPCB 1320. The body portion 1322 may be located between a first side 1321 and a second side 1323. Accordingly, the second antenna module 1330 may be electrically coupled to the RFIC 1310 and the printed circuit board (e.g., the printed circuit board 370 of FIG. 3 and FIG. 4).

As an embodiment, the RFIC 1310 may have a thickness of about 1.0 mm. The FPCB 1320 may have a thickness of about 0.15 mm to about 2.0 mm.

Figure 14A:
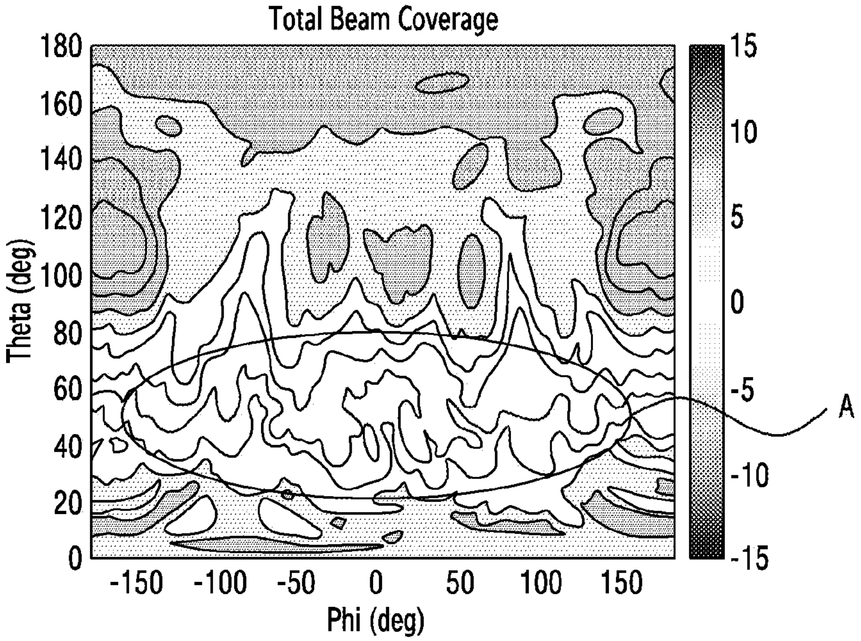
FIGS. 14A and 14B are diagrams illustrating a comparison between mmWave radiation efficiency of an antenna module of a slidable electronic device according to a comparative example and mmWave radiation efficiency of an electronic according to various embodiments.
Figure 14B:
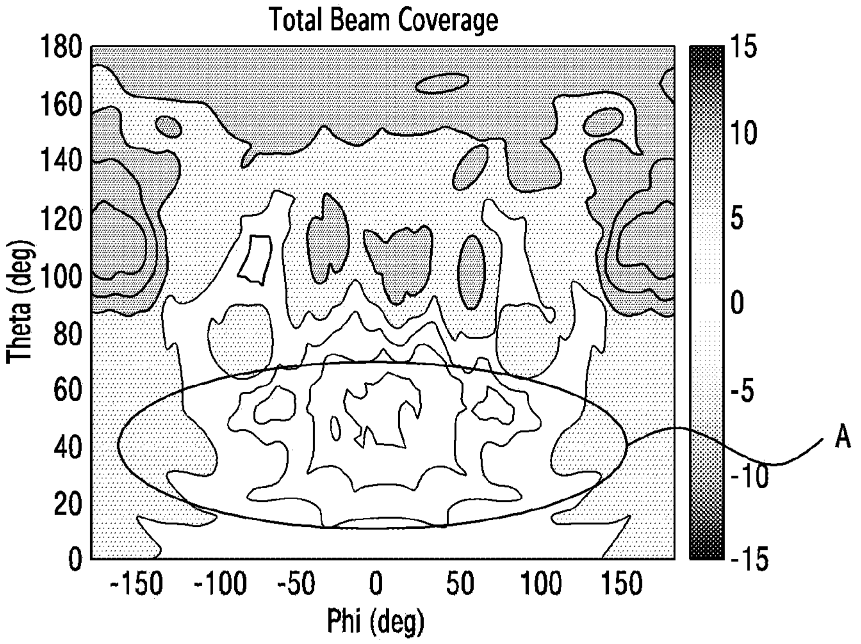
Figure 15:
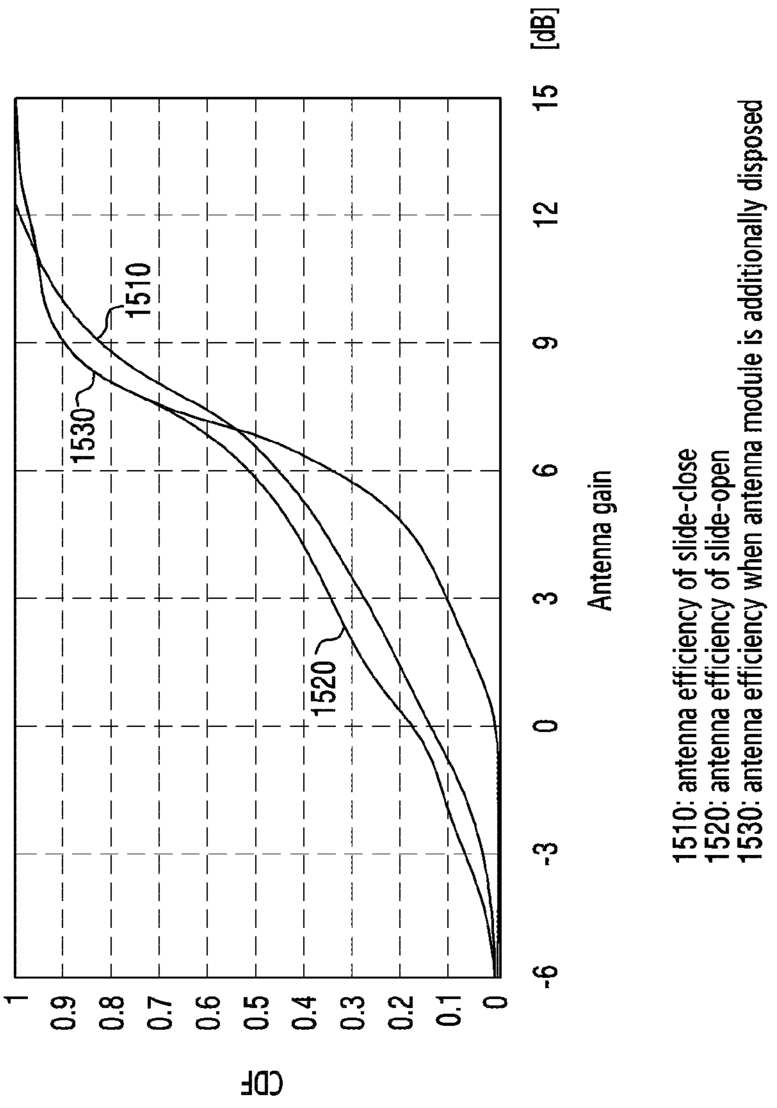
FIG. 15 is a graph illustrating a comparison between mmWave radiation efficiency of an antenna module of a slidable electronic device according to a comparative example and mmWave radiation efficiency of an electronic according to various embodiments.

FIGS. 14A, 14B and 15 are graphs illustrating a comparison between radiation efficiency of an antenna module of a slidable electronic device according to a comparative example and radiation efficiency of an antenna module of an electronic device (e.g., the electronic device 300 of FIG. 5 and FIG. 6) according to various embodiments of the disclosure. FIG. 14A illustrates the radiation efficiency of the antenna module of the slidable electronic device according to the comparative example, and FIG. 14B illustrates the radiation efficiency of the antenna module of the electronic device (e.g., the electronic device 300 of FIG. 5 and FIG. 6) according to the various embodiments.

Referring to FIG. 5, FIG. 6, FIGS. 14A and 14B, and FIG. 15, theta 0 degrees correspond to a front direction of the electronic device 300, and theta 90 degrees correspond to a rear direction of the electronic device 300. Phi 90 degrees correspond to a first side direction (e.g., a first side direction S1 of FIG. 5) of the electronic device 300, and phi 0 degrees correspond to a second side direction (e.g., a second side direction S2 of FIG. 5) of the electronic device 300. As an embodiment, when viewed from a rear face of the electronic device 300, a left direction may be the first side direction (e.g., the first side direction S1 of FIG. 5). As an embodiment, when viewed from the rear face of the electronic device 300, a right direction may be the second side direction (e.g., the second side direction S2 of FIG. 5).

Comparing a region “A” of FIGS. 14A and 14B, a radiation pattern 1530 of the second antenna module 330 has a wider coverage than radiation patterns 1510 and 1520 of the third antenna module 340, and mmWave radiation efficiency of an antenna is improved.

In a slide-close (e.g., a screen-reduced) state, the radiation pattern 1530 of the second antenna module 330 has a wider coverage than the radiation pattern 1510 of the third antenna module 340 disposed to form a beam toward the side face 301*b* of the first housing 301, and the mmWave radiation efficiency of the antenna is improved. In addition, in a slide-open (e.g., a screen-extended) state, the radiation pattern 1530 of the second antenna module 330 has a wider coverage than the radiation pattern 1520 of the third antenna module 340 disposed to form a beam toward the side face 301*b* of the first housing 301, and the mmWave radiation efficiency of the antenna is improved.

TABLE 1

| CDF (28 GHz) | Slide Close [dB] | Slide Open [dB] | Add rear face module (dispose upper end) [dB] |
|---|---|---|---|
| Peak | 12.6 | 13.8 | 13.8 |
| 80% | 8.9 | 8.2 | 8.2 |
| 50% | 6.6 | 5.9 | 6.9 |
| 20% | 1.3 | 0.3 | 4.8 |

As disclosed in Table 1, for the electronic device (e.g., the slidable phone) according to the comparative example, in the slide-close (e.g., the display-reduced) state, mmWave radiation efficiency of cumulative density function (CDF) 20% is about 1.3 [dB], mmWave radiation efficiency of CDF 50% is about 6.6 [dB], mmWave radiation efficiency of CDF 80% is about 8.9 [dB], and mmWave radiation efficiency of CDF peak is about 12.6 [dB].

For the electronic device (e.g., the slidable phone) according to the comparative example, in the slide-open (e.g., the display-extended) state, mmWave radiation efficiency of CDF 20% is about 0.3 [dB], mmWave radiation efficiency of CDF 50% is about 5.9 [dB], mmWave radiation efficiency of CDF 80% is about 8.2 [dB], and mmWave radiation efficiency of CDF peak is about 13.8 [dB].

In case of applying the second antenna module 330 of the electronic device 300 according to an embodiment of the disclosure, in the slide-open (e.g., the display-extended) state, mmWave radiation efficiency of CDF 20% is about 4.8 [dB], mmWave radiation efficiency of CDF 50% is about 6.9 [dB], mmWave radiation efficiency of CDF 80% is about 8.2 [dB], and mmWave radiation efficiency of CDF peak is about 13.8 [dB].

In the slide-close (e.g., the screen-reduced) state, the radiation pattern 830 of the second antenna module 330 has a wider coverage than the radiation pattern 810 of the third antenna module 340 disposed to form a beam toward the side face 301*b* of the first housing 301, and mmWave radiation efficiency of the antenna may be improved. In addition, in the slide-open (e.g., the screen-extended) state, the radiation pattern 830 of the second antenna module 330 has a wider coverage than the radiation pattern 820 of the third antenna module 340 disposed to form a beam toward the side face 301*b* of the first housing 301, and mmWave radiation efficiency of the antenna may be improved.

As such, since the second antenna module 330 is disposed to the second housing 303, in the slide-close (e.g., the screen-reduced) and slide-open (e.g., the screen-extended) states, a coverage of an antenna module may be increased, and radiation efficiency may be improved.

Figure 16:
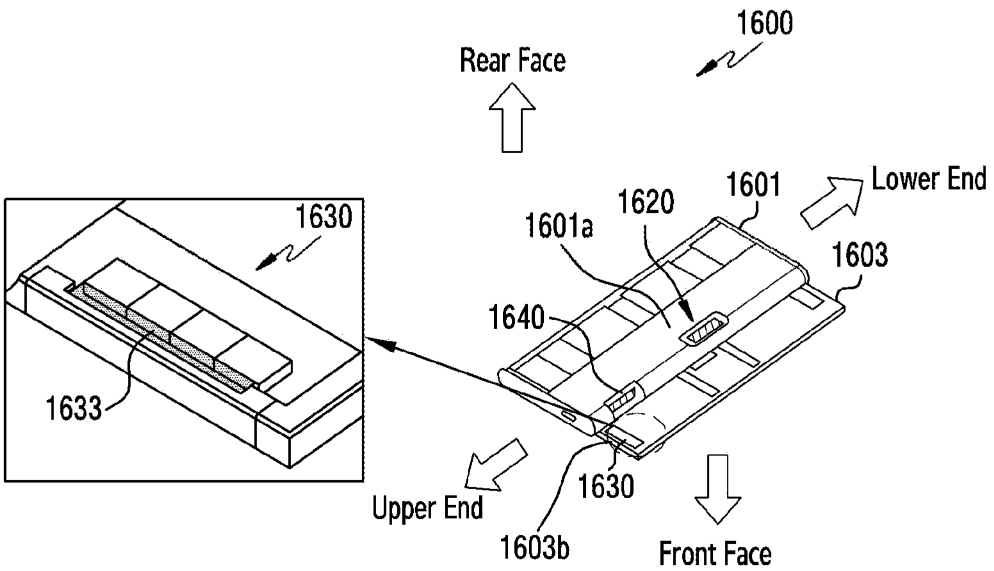
FIG. 16 is a perspective view illustrating antenna modules disposed to a rear face in a slide-open (e.g., a display-extended) state of an electronic device according to various embodiments.

FIG. 16 is a perspective view illustrating antenna modules in a slide-open (e.g., a display-extended) state of an electronic device 1600 according to various embodiments.

Referring to FIG. 16, the electronic device 1600 (e.g., the electronic device 101 of FIG. 1 and the electronic device 200 of FIG. 2) may include a first housing 1601, a second housing 1603, a display 1610, a first antenna module 1620 (e.g., the first antenna module 320 of FIG. 6), a second antenna module 1630 (e.g., the second antenna module 330 of FIG. 6), a third antenna module 1640 (e.g., the third antenna module 340 of FIG. 6), an FPCB (e.g., the FPCB 350 of FIG. 9), a printed circuit board (e.g., the printed circuit board 370 of FIG. 3 and FIG. 4), and/or a hinge structure (e.g., the hinge structure 390 of FIG. 3 and FIG. 4).

According to an embodiment, the first housing 1601 may include at least part of the display 1610, the first antenna module 1620, the third antenna module 1640, part of the FPCB (e.g., the FPCB 350 of FIG. 3 and FIG. 4), the printed circuit board (e.g., the printed circuit board 370 of FIG. 3 and FIG. 4), the hinge structure (e.g., the hinge structure 390 of FIG. 3 and FIG. 4), and a battery (e.g., the battery 189 of FIG. 1). At least part of the first housing 1601 may be constructed of a metal material. For example, at least part of a metal frame included in a side face of the first housing 1601 may be used as an antenna (not shown) radiator.

According to various embodiments, an exposed width of the display 1610 (e.g., the display module 160 of FIG. 1, the display 210 of FIG. 2) may be adjusted based on a movement of the second housing 1603.

According to various embodiments, the first antenna module 1620 and the third antenna module 1640 may include a plurality of patch antennas which radiate a frequency of a mmWave band. The first antenna module 1620 may be disposed to form a beam toward an opposite direction of the display 1610 of the first housing 1601 of the electronic device 1600. For example, the first antenna module 1620 may be disposed in a first direction (e.g., horizontally) on a rear face 1601*a* of the first housing 1601. The first antenna module 1620 may radiate a radio wave (e.g., mmWave) toward the rear face 1601*a* of the electronic device 1600.

According to various embodiments, the third antenna module 1640 may include a plurality of patch antennas which radiate a frequency of a mmWave band. The third antenna module 1640 may be disposed adjacent to a side face of the first housing 1601 of the electronic device 1600. The third antenna module 1640 may be disposed to form a beam in a second direction (e.g., vertically) toward the side face of the first housing 1601. The third antenna module 1640 may radiate a radio wave (mmWave) toward a side face of the electronic device 1600. For example, the first antenna module 1620 and the third antenna module 1640 may be disposed in orthogonal directions.

According to various embodiments, the second housing 1603 may include a metal material. Part of the display 1610, the second antenna module 1630 (e.g., the slide antenna module), and/or part of the FPCB (e.g., the FPCB 350 of FIG. 9) may be disposed to the second housing 1603. The second antenna module 1630 may be disposed to the second housing 1603, between the first housing 1601 and the display 1610. For example, in the slide-open state, when viewed from above the display 1610, the second antenna module 1630 may not overlap with the first housing 1601. The RFIC (e.g., the RFIC 340 of FIG. 3 and FIG. 4) included in the second antenna module 1630 may be electrically coupled to the printed circuit board (e.g., the printed circuit board 370 of FIG. 3 and FIG. 4) through the FPCB (e.g., the FPCB 350 of FIG. 9).

According to various embodiments, the second antenna module 1630 may include a plurality of antennas 1633 which radiate a frequency of a mmWave band.

According to an embodiment, the second antenna module 1630 may be disposed to the second housing 1603 to form a beam toward an upper end 1603*b*. For example, the second antenna module 1630 may be disposed adjacent to the upper end 1603*b* of the electronic device 1600. The second antenna module 1630 may radiate a radio wave (e.g., mmWave) toward the upper end 1603*b* of the electronic device 1600.

FIG. 16 illustrates an example in which the second antenna module 1630 is disposed at a location adjacent to or overlapping with the third antenna module 1640, when in a slide-close (e.g., a screen-reduced) state of the electronic device 1600. However, without being limited thereto, the second antenna module 1630 may be disposed to be spaced apart from the third antenna module 1640, when in the slide-close (e.g., the screen-reduced) state of the electronic device 1600.

As an embodiment, the second antenna module 1630 may operate when the electronic device 1600 is in the slide-open (e.g., the display-extended) state, and may not operate when in the slide-close (e.g., the display-reduced) state. However, without being limited thereto, the second antenna module 1630 may operate in both cases where the electronic device 1600 is in the slide-open (e.g., the display-extended) state and in the slide-close (e.g., the display-reduced) state.

As various embodiments, identically or similarly to FIG. 10, FIG. 11, FIG. 12, or FIG. 13, the second antenna module 1630, the RFIC, the FPCB, and/or the printed circuit board may be electrically coupled.

Figure 17A:
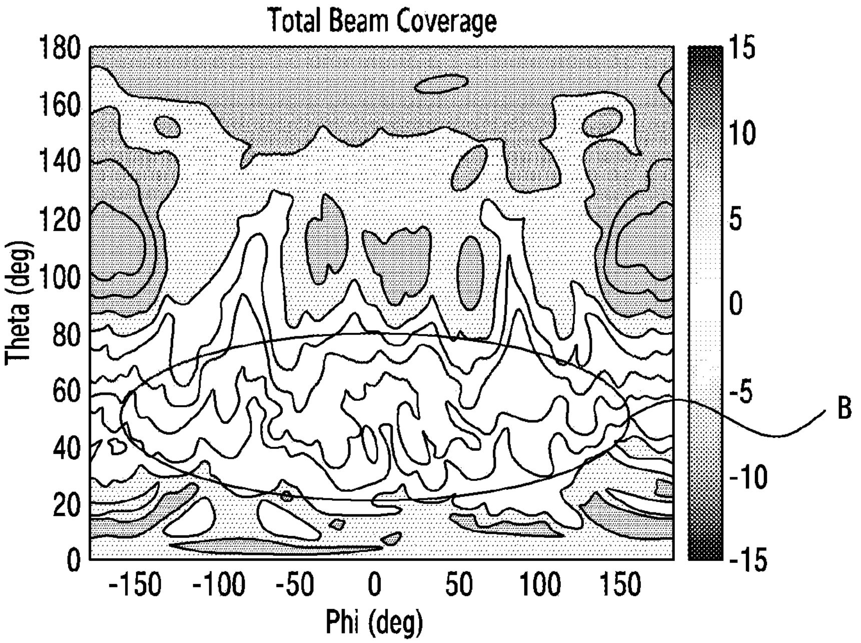
FIGS. 17A and 17B are diagrams illustrating a comparison between mmWave radiation efficiency of a slidable electronic device according to a comparative example and mmWave radiation efficiency of an electronic device according to various embodiments.
Figure 17B:
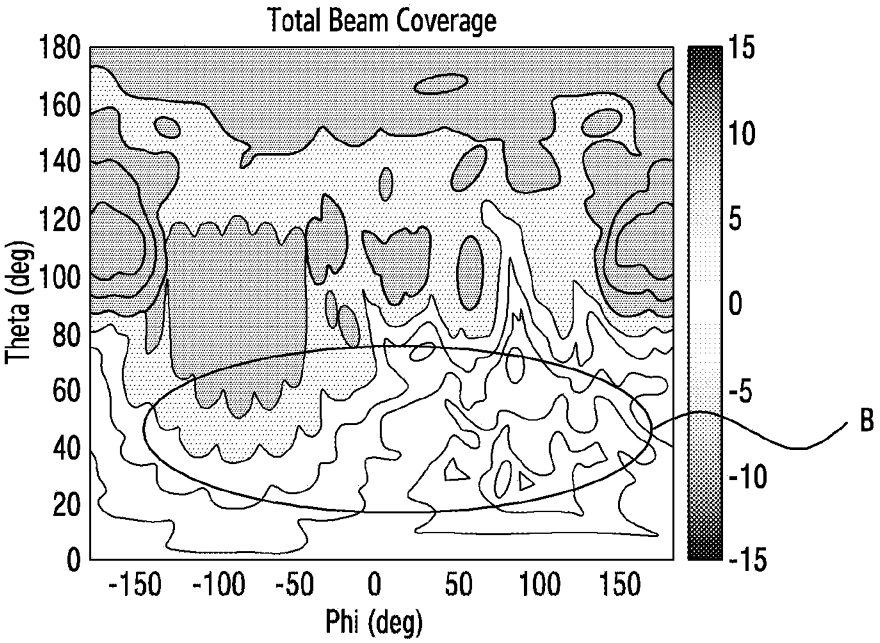
Figure 18:
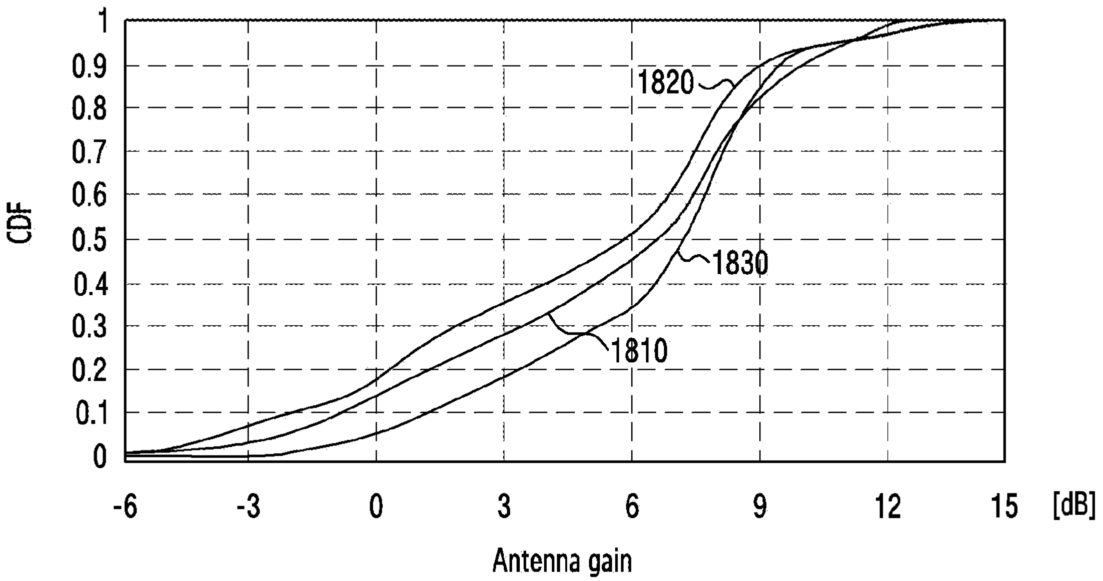
FIG. 18 is a graph illustrating a comparison between mmWave radiation efficiency of a slidable electronic device according to a comparative example and mmWave radiation efficiency of an electronic device according to various embodiments.

FIGS. 17A and 17B, and FIG. 18 are graphs illustrating a comparison between mmWave radiation efficiency of a slidable electronic device according to a comparative example and mmWave radiation efficiency of an electronic device (e.g., the electronic device 1600 of FIG. 16) according to various embodiments. FIG. 17A illustrates the mmWave radiation efficiency of the slidable electronic device according to the comparative example, and FIG. 17B illustrates the mmWave radiation efficiency of the electronic device (e.g., the electronic device 1600 of FIG. 16) according to the various embodiments.

Referring to FIG. 16, FIGS. 17A and 17B, and FIG. 18, theta 0 degrees correspond to a front direction of the electronic device 1600, and theta 90 degrees correspond to a rear direction of the electronic device 1600. Phi 90 degrees correspond to a first direction (e.g., an upper end direction of FIG. 16) of the electronic device 1600, and phi 0 degrees correspond to a second direction (e.g., a lower end direction of FIG. 16) of the electronic device 1600. As an embodiment, when viewed from a rear face of the electronic device 1600, the upper end direction may be the first direction. As an embodiment, when viewed from the rear face of the electronic device 1600, the lower end direction may be the second direction.

Comparing a region “B” of FIGS. 17A and 17B, a radiation pattern 1830 of the second antenna module 1640 has a wider coverage than a radiation pattern 1820 of the third antenna module 1640, and mmWave radiation efficiency of an antenna is improved.

In a slide-close (e.g., a screen-reduced) state, the radiation pattern 1830 of the second antenna module 1630 has a wider coverage than the radiation pattern 1810 of the third antenna module 1640 disposed to form a beam toward the side face of the first housing 1601, and the mmWave radiation efficiency of the antenna is improved. In addition, in a slide-open (e.g., a screen-extended) state, the radiation pattern 1830 of the second antenna module 1630 has a wider coverage than the radiation pattern 1820 of the third antenna module 1640 disposed in a direction perpendicular to the side face of the first housing 1601, and the mmWave radiation efficiency of the antenna is improved. For example, when the second antenna module 1630 is added together with the third antenna module 1640, a coverage of mmWave may be increased in the slide open (e.g., the screen-extended) state.

TABLE 2

| CDF (28 GHz) | Slide Close [dB] | Slide Open [dB] | Add rear face module (dispose upper end) [dB] |
|---|---|---|---|
| Peak | 12.6 | 13.8 | 14.1 |
| 80% | 8.9 | 8.2 | 9.0 |
| 50% | 6.6 | 5.9 | 7.4 |
| 20% | 1.3 | 0.3 | 3.5 |

As disclosed in Table 2, for the electronic device (e.g., the slidable phone) according to the comparative example, in the slide-close (e.g., the display-reduced) state, mmWave radiation efficiency of cumulative density function (CDF) 20% is about 1.3 [dB], mmWave radiation efficiency of CDF 50% is about 6.6 [dB], mmWave radiation efficiency of CDF 80% is about 8.9 [dB], and mmWave radiation efficiency of CDF peak is about 12.6 [dB].

For the electronic device (e.g., the slidable phone) according to the comparative example, in the slide-open (e.g., the display-extended) state, mmWave radiation efficiency of CDF 20% is about 0.3 [dB], mmWave radiation efficiency of CDF 50% is about 5.9 [dB], mmWave radiation efficiency of CDF 80% is about 8.2 [dB], and mmWave radiation efficiency of CDF peak is about 13.8 [dB].

In case of applying the second antenna module 1630 of the electronic device 1600 according to an embodiment of the disclosure, in the slide-open (e.g., the display-extended) state, mmWave radiation efficiency of CDF 20% is about 3.5 [dB], mmWave radiation efficiency of CDF 50% is about 7.4 [dB], mmWave radiation efficiency of CDF 80% is about 9.0 [dB], and mmWave radiation efficiency of CDF peak is about 14.1 [dB].

In the slide-close (e.g., the screen-reduced) state, the radiation pattern 1830 of the second antenna module 1630 has a wider coverage than the radiation pattern 1810 of the third antenna module 1640 disposed in a direction perpendicular to the side face of the first housing 1601, and mmWave radiation efficiency of the antenna may be improved. In addition, in the slide-open (e.g., the screen-extended) state, the radiation pattern 1830 of the second antenna module 1630 has a wider coverage than the radiation pattern 1820 of the third antenna module 1640 disposed in the direction perpendicular to the side face of the first housing 1601, and mmWave radiation efficiency of the antenna may be improved.

As such, in the rear face 1601*a* (e.g., an opposite direction of the display 310) of the second housing 1603, the second antenna module 1630 including the plurality of antennas 1633 is disposed to the side face of the electronic device. Therefore, in the slide-close (e.g., the screen-reduced) and slide-open (e.g., the screen-extended) states, the coverage of mmWave may be increased, and the mmWave radiation efficiency of the antenna may be improved.

Figure 19:
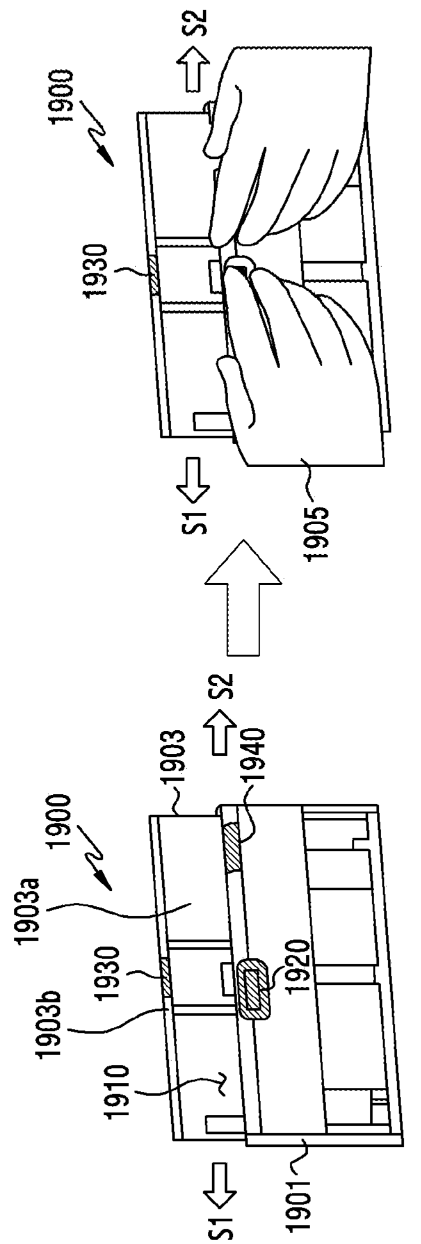
FIG. 19 is a perspective view illustrating antenna modules disposed to a rear face in a slide-open (e.g., a display-extended) state of an electronic device according to various embodiments.

FIG. 19 is a perspective view illustrating antenna modules in a slide-open (e.g., a display-extended) state of an electronic device 1900 according to various embodiments.

Referring to FIG. 19, a second antenna module 1930 may be disposed to correspond to a rear face of a display 1910 (e.g., the display 310 of FIG. 3) of the electronic device 1900. For example, the second antenna module 1930 may include a patch antenna which forms a beam toward a rear face of the electronic device 1900 and/or a dipole antenna which forms a beam toward a side face. For instance, the beam may be formed in the rear direction and/or side direction of the electronic device 1900 by means of the second antenna module 1930.

According to various usage types (e.g., telephony, Internet surfing, gaming, or video watching) of the electronic device 1900, the electronic device 1900 may be used in a horizontal direction. When the electronic device 1900 uses in a landscape mode in a slide-open (e.g., a screen-extended) state, a first antenna module 1920 and a third antenna module 1940 may be covered by a user’s hand 1905. Even if the first antenna module 1920 and the third antenna module 1940 are covered, a beam may be formed in a side direction or rear direction of the electronic device 1900 by means of the second antenna module 1930, thereby increasing a coverage of mmWave in the slide-open state.

Figure 20:
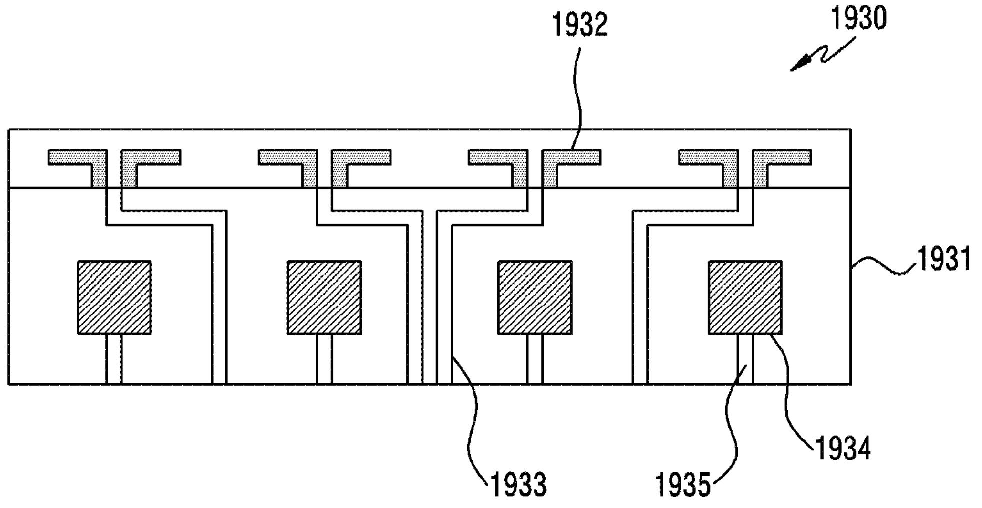
FIG. 20 is a diagram illustrating a second antenna module located at a rear face of a second housing of an electronic device according to various embodiments.

FIG. 20 is a diagram illustrating a second antenna module 1930 according to various embodiments of the disclosure.

Referring to FIG. 19 and FIG. 20, according to various embodiments, the second antenna module 1930 may include a substrate 1931, a plurality of dipole antennas 1932 which radiate a frequency of a mmWave band, and a plurality of patch antennas 1934. However, without being limited thereto, the second antenna module 1930 may include a tapered slot antenna or a parallel plate waveguide antenna.

The second antenna module 1930 may include a plurality of first antenna feeding lines 1933 which couple the plurality of dipole antennas 1932 and an RFIC (e.g., the RFIC 1010 of FIG. 9). The second antenna module 1930 may include a plurality of second antenna feeding lines 1935 which couple the plurality of patch antennas 1934 and the RFIC (e.g., the RFIC 1010 of FIG. 9). For example, the substrate 1931 may include the plurality of dipole antennas 1932 and/or the plurality of patch antennas 1934.

According to various embodiments, the plurality of dipole antennas 1932 may radiate a radio wave (mmWave) toward a side face 1903*b* of the electronic device 1900. The plurality of patch antennas 1934 may radiate a radio wave (mmWave) toward a rear face 1903*a* of the electronic device 1900. For example, the second antenna module 1930 may be disposed to a second housing 1903 so that the plurality of dipole antennas 1932 form a beam toward the side face 1903*b* and the plurality of patch antennas 1934 form a beam toward the rear face 1903*a*.

A user may use the electronic device 1900 to execute various functions such as Internet surfing, gaming, or video watching as well as a telephony function. A way of gripping the electronic device 1900 may vary depending on the execution of the function.

When the electronic device 1900 of FIG. 19 is in a slide-open (e.g., a display-extended) state, the electronic device 1900 may be gripped with both hands. In this case, since the first antenna module 1920 and a third antenna module 1940 are covered by both hands of the user, an antenna coverage may decrease, and antenna efficiency may decrease by about 10 [dB].

Similarly to the electronic device 1900 according to an embodiment of the disclosure, the second antenna module 1930 including the plurality of dipole antennas 1932 and the plurality of patch antennas 1934 is disposed adjacent to the side face 1903*b* in the second housing 1903, thereby increasing the antenna coverage and improving the antenna efficiency.

Figure 21:
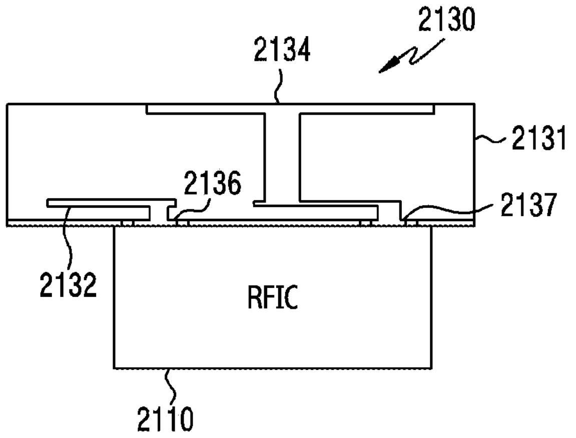
FIG. 21 is a diagram illustrating a connection structure of a second antenna module and RFIC of an electronic device according to various embodiments.

FIG. 21 is a diagram illustrating a connection structure of a second antenna module and RFIC of an electronic device according to various embodiments.

Referring to FIG. 20 and FIG. 21, an electronic device (e.g., the electronic device 300 of FIG. 3 and FIG. 4) according to various embodiments may include a second antenna module 2130. The second antenna module 2130 may be electrically coupled to a printed circuit board (e.g., the printed circuit board 370 of FIG. 3 and FIG. 4) through an FPCB (e.g., the FPCB 350 of FIG. 3 and FIG. 4). For example, a CP (e.g., the co-processor 123 of FIG. 1) or an intermediate frequency integrated circuit (IFIC) may be disposed to the printed circuit board.

According to an embodiment, the second antenna module 2130 may include a substrate 2131, a plurality of dipole antennas 2132 which radiate a frequency of a mmWave band, a plurality of patch antennas 2134 which radiate a frequency of a mmWave band, and an RFIC 2110. However, without being limited thereto, the second antenna module 2130 may include a tapered slot antenna or a parallel plate waveguide antenna.

According to an embodiment, the second antenna module 2130 may include a plurality of first antenna feeding lines 2136 which couple the plurality of dipole antennas 2132 and the RFIC 2110. The second antenna module 2130 may include a plurality of second antenna feeding lines 2137 which couple the plurality of patch antennas 2134 and the RFIC 2100. For example, the substrate 2131 may include the plurality of dipole antennas 2132 and the plurality of patch antennas 2134.

In an embodiment, a first face (e.g., an upper face) of the substrate 2131 may be disposed toward a rear face (e.g., the rear face 300*b* of FIG. 3) of an electronic device (e.g., the electronic device 300 of FIG. 3 and FIG. 4). For example, the first face may be a face of the substrate 2131 on which the plurality of patch antennas 2134 are disposed to form a beam pattern toward a rear face of the electronic device. A second face (e.g., a lower face) of the substrate 2131 may be disposed toward a front face (e.g., the front face 300*a* of FIG. 3) of the electronic device (e.g., the electronic device 300 of FIG. 3 and FIG. 4). The RFIC 2110 may be disposed to the second face (e.g., the lower face) of the substrate 2131. For example, the second face (e.g., the lower face) of the substrate 2131 and the first face (e.g., the upper face) of the RFIC 2110 are disposed to be in contact, and the plurality of first antenna feeding lines 2136 and the plurality of second antenna feeding lines 2137 may be electrically coupled to the RFIC 2110. Accordingly, the plurality of dipole antennas 2132 and the plurality of patch antennas 2134 may be electrically coupled to the RFIC 2110.

According to an embodiment, the RFIC 2110 may be electrically coupled directly to the substrate 2131, and the RFIC 2110 may be electrically coupled to a printed circuit board (e.g., the printed circuit board 370 of FIG. 3 and FIG. 4) using an FPCB (e.g., the FPCB 350 of FIG. 9). Since the FPCB (e.g., the FPCB 350 of FIG. 9) is disposed between the RFIC 2110 and the printed circuit board (e.g., the printed circuit board 370 of FIG. 3 and FIG. 4), the RFIC 2110 may be electrically coupled to the printed circuit board in case of slide-open (e.g., display-extended) and slide-close (e.g., display-reduced) of an electronic device (e.g., the electronic device 300 of FIG. 5).

According to an embodiment, the second antenna module 2130 and the printed circuit board (e.g., the printed circuit board 370 of FIG. 3 and FIG. 4) may be electrically coupled using a connection member other than the FPCB. For example, the second antenna module 2130 and the printed circuit board (e.g., the printed circuit board 370 of FIG. 3 and FIG. 4) may be coupled using a coaxial cable.

Figure 22A:
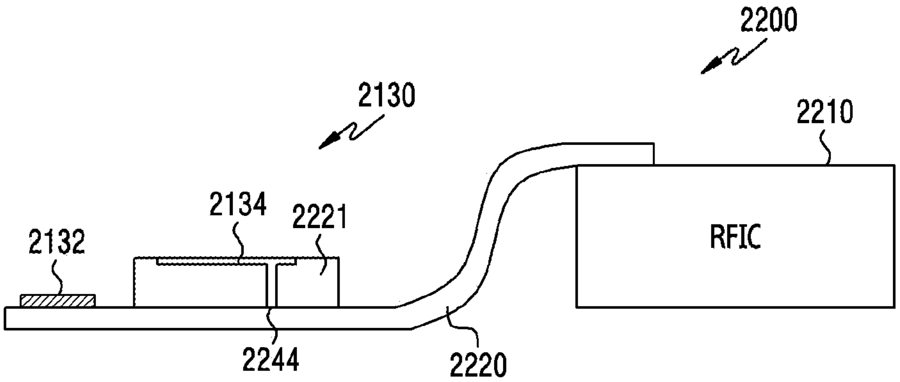
FIG. 22A and FIG. 22B are diagrams illustrating a connection structure of a second antenna module, RFIC, and FPCB of an electronic device according to various embodiments.
Figure 22B:
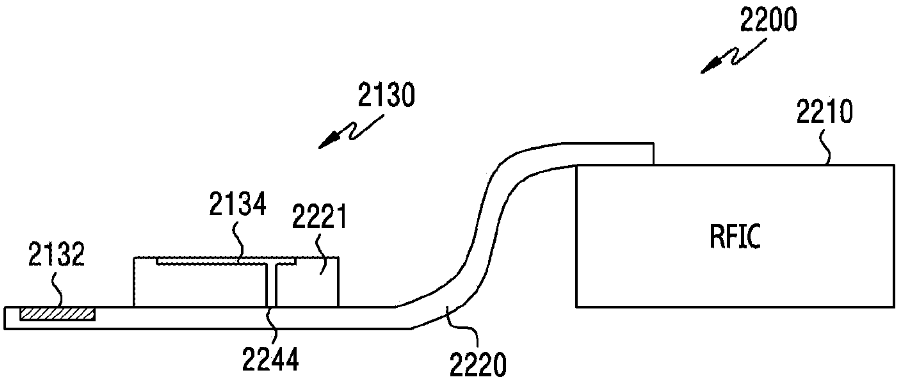

FIG. 22A and FIG. 22B are diagrams illustrating a structure of a second antenna module 2130 according to various embodiments.

Referring to FIG. 22A and FIG. 22B, an electronic device 2200 according to various embodiments may include the second antenna module 2130 and/or a printed circuit board (e.g., the printed circuit board 370 of FIG. 3 and FIG. 4).

According to an embodiment, the second antenna module 2130 may include a plurality of dipole antennas 2132 which radiate a frequency of a mmWave band, a substrate 2221, a plurality of patch antennas 2134 which radiate a frequency of a mmWave band, a plurality of antenna feeding lines 2244, an FPCB 2220, and/or an RFIC 2210. The antenna module 2130 and the RFIC 2210 may be disposed to be spaced apart, and the antenna module 2130 and the RFIC 2210 may be electrically coupled through the FPCB 2220.

In an embodiment, as shown in FIG. 22A, the plurality of dipole antennas 2132 may be constructed on a first face (e.g., an upper face) of the FPCB 2220, and may be electrically coupled. The substrate 2221 may be disposed on the first face (e.g., the upper face) of the FPCB 2220, and may be electrically coupled. In an embodiment, as shown in FIG. 22B, the plurality of dipole antennas 2132 may be constructed inside the FPCB 2220.

In an embodiment, the substrate 2221 may include the plurality of patch antennas 2134. For instance, the plurality of dipole antennas 2132 and the plurality of patch antennas 2134 may be spaced apart in the second antenna module 2130. The FPCB 2220 may electrically couple the plurality of dipole antennas 2132 to the plurality of patch antennas 2134 and the RFIC 2210.

As an example, the RFIC 2210 may be disposed to the printed circuit board (e.g., the printed circuit board 370 of FIG. 3 and FIG. 4). However, without being limited thereto, an FPCB (not shown) may be disposed between the RFIC 2210 and the printed circuit board (e.g., the printed circuit board 370 of FIG. 3 and FIG. 4) to electrically couple the RFIC 2210 and the printed circuit board (e.g., the printed circuit board 370 of FIG. 3 and FIG. 4).

According to an embodiment, the RFIC 2210 and the printed circuit board (e.g., the printed circuit board 370 of FIG. 3 and FIG. 4) may be electrically coupled using a connection member other than the FPCB. For example, the RFIC 2210 and the printed circuit board (e.g., the printed circuit board 370 of FIG. 3 and FIG. 4) may be coupled using a coaxial cable.

Figure 23A:
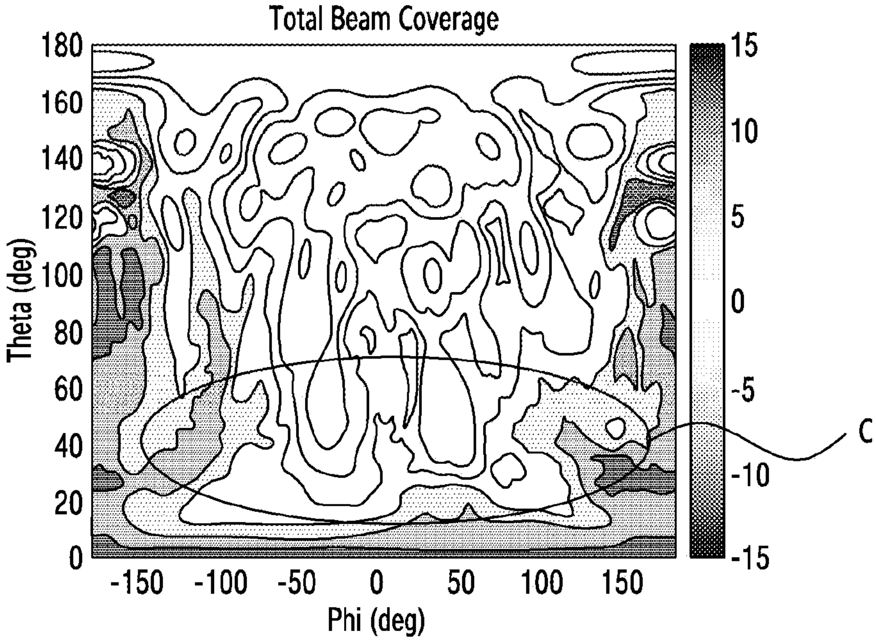
FIGS. 23A and 23B are diagrams illustrating a comparison between mmWave radiation efficiency of a slidable electronic device according to a comparative example and mmWave radiation efficiency of an electronic device according to various embodiments.
Figure 23B:
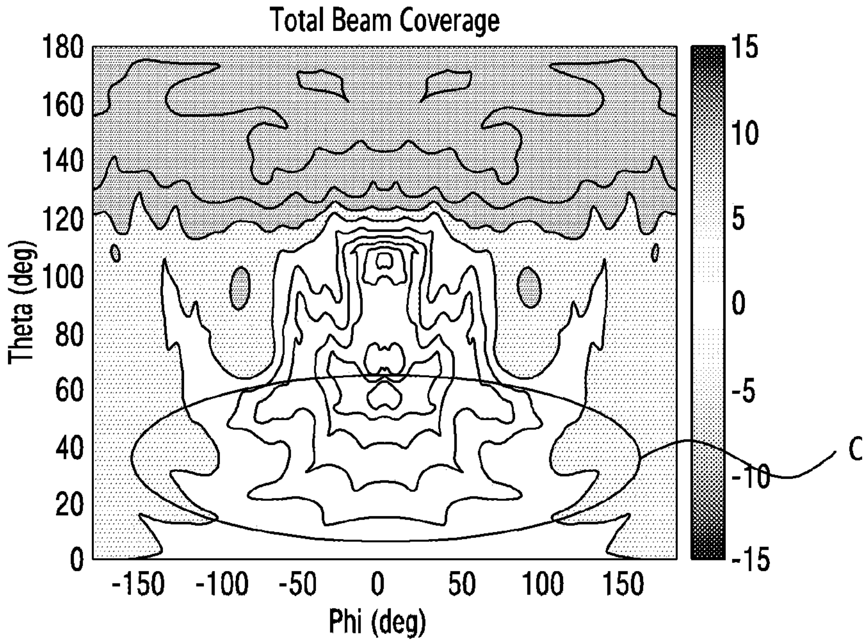
Figure 24:
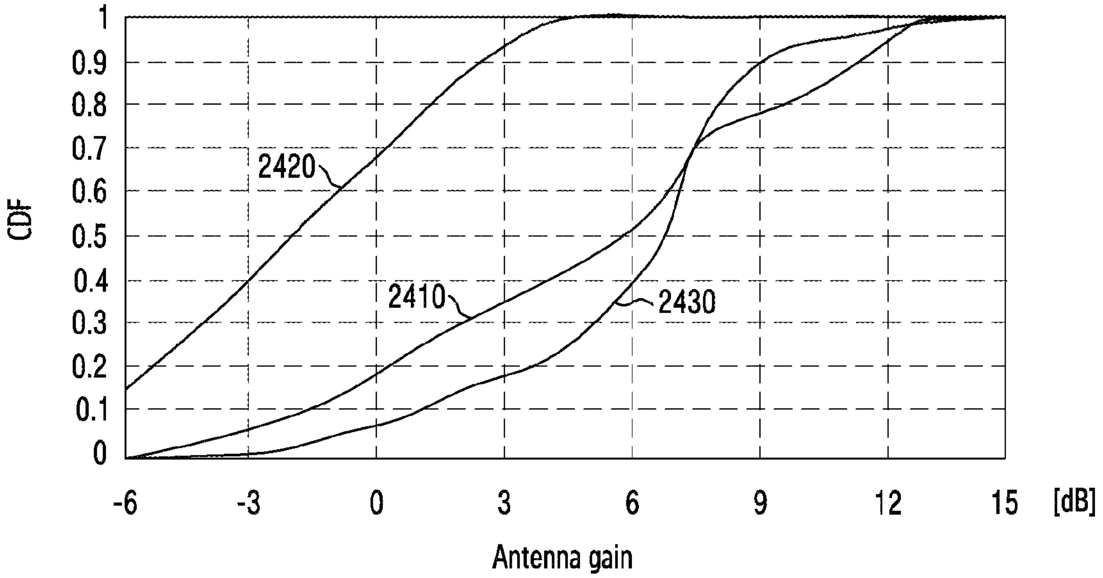
FIG. 24 is a graph illustrating a comparison between mmWave radiation efficiency of a slidable electronic device according to a comparative example and mmWave radiation efficiency of an electronic device according to various embodiments of the disclosure.

FIGS. 23A, 23B and FIG. 24 are graphs illustrating a comparison between mmWave radiation efficiency of a slidable electronic device according to a comparative example and mmWave radiation efficiency of an electronic device (e.g., the electronic device 1900 of FIG. 19) according to various embodiments. FIG. 23A illustrates the mmWave radiation efficiency of the slidable electronic device according to the comparative example, and FIG. 23B illustrates the mmWave radiation efficiency of the electronic device (e.g., the electronic device 1900 of FIG. 19) according to the various embodiments.

Referring to FIG. 19, FIGS. 23A, 23B, and FIG. 24, theta 0 degrees correspond to a front direction of the electronic device 1900, and theta 90 degrees correspond to a rear direction of the electronic device 1900. Phi 90 degrees correspond to a first side direction (e.g., a first side direction S1 of FIG. 19) of the electronic device 1900, and phi 0 degrees correspond to a second side direction (e.g., a second side direction S2 of FIG. 19) of the electronic device 1900. As an embodiment, when viewed from a rear face of the electronic device 1900, a left direction may be the first side direction (e.g., the first side direction S1 of FIG. 19). As an embodiment, when viewed from the rear face of the electronic device 1900, a right direction may be the second side direction (e.g., the second side direction S2 of FIG. 19).

Comparing a region "C" of FIGS. 23A and 23B, a radiation pattern 2430 of the second antenna module 1930 has a wider coverage than radiation patterns 2410 and 2420 of the third antenna module 1940, and mmWave radiation efficiency of an antenna is improved.

In a slide-close (e.g., a screen-reduced) state, the radiation pattern 2430 of the second antenna module 1930 has a wider coverage than the radiation pattern 2410 of the third antenna module 1940 disposed in a direction perpendicular to the side face of the first housing 1901, and the mmWave radiation efficiency of the antenna is improved. In addition, in a slide-open (e.g., a screen-extended) state, the radiation pattern 2430 of the second antenna module 1930 has a wider coverage than the radiation pattern 2420 of the third antenna module 1940 disposed in a direction perpendicular to the side face of the first housing 1901, and the mmWave radiation efficiency of the antenna is improved.

TABLE 3

| CDF (28 GHz) | Slide Close [dB] | Slide Open [dB] | Add rear face module (dispose upper end) [dB] |
|---|---|---|---|
| Peak | 13.8 | 5.4 | 13.5 |
| 80% | 8.2 | 1.4 | 9.6 |
| 50% | 5.9 | −1.9 | 6.9 |
| 20% | 0.3 | −5.4 | 3.3 |

As disclosed in Table 3, for the electronic device (e.g., the slidable phone) according to the comparative example, in the slide-close (e.g., the display-reduced) state, mmWave radiation efficiency of cumulative density function (CDF) 20% is about 0.3 [dB], mmWave radiation efficiency of CDF 50% is about 5.9 [dB], mmWave radiation efficiency of CDF 80% is about 8.2 [dB], and mmWave radiation efficiency of CDF peak is about 13.8 [dB].

When a user grips the electronic device (e.g., the slidable phone) according to the comparative example with both hands in the slide-open (e.g., the display-extended) state, mmWave radiation efficiency of CDF 20% is about −5.4 [dB], mmWave radiation efficiency of CDF 50% is about −1.9 [dB], mmWave radiation efficiency of CDF 80% is about 1.4 [dB], and mmWave radiation efficiency of CDF peak is about 5.4 [dB].

In case of applying the second antenna module 1930 of the electronic device 1900 according to an embodiment of the disclosure, antenna radiation efficiency may increase even if the user horizontally grips the electronic device in the slide-open (e.g., the display-extended) state. For example, in the slide-open (e.g., the display-extended) state, mmWave radiation efficiency of CDF 20% is about 3.3 [dB], mmWave radiation efficiency of CDF 50% is about 6.9 [dB], mmWave radiation efficiency of CDF 80% is about 9.6 [dB], and mmWave radiation efficiency of CDF peak is about 13.5 [dB].

As such, since the second antenna module 1902 including the plurality of dipole antennas 1932 and the plurality of patch antennas 1934 is disposed to the rear face 1901*a* (e.g., an opposite direction of the display 310) of the second housing 1903, even if the user grips the electronic device 1900 with both hands, a coverage of mmWave may be increased, and mmWave radiation efficiency of an antenna may be improved.

An electronic device (e.g., the electronic device 101 of FIG. 1, the electronic device 200 of FIG. 2, the electronic device 300 of FIG. 3 and/or FIG. 4) according to various example embodiments may include first housings, second housings configured to slide from the first housings, flexible displays disposed to the first housings and having screens configured to be reduced/extended according to the sliding of the second housings, a first antenna module including at least one antenna disposed to the first housings and configured to radiate a millimeter wave, and the second antenna module including at least one antenna disposed to the second housings and configured to radiate a millimeter wave. The second antenna module may be located adjacent to one side face of the second housings, and may be configured to form a beam in a same direction as the first antenna module.

The first antenna module of the electronic devices according to various example embodiments may include the plurality of patch antennas. The second antenna module may include the plurality of dipole antennas.

The second antenna module of the electronic devices according to various example embodiments may be configured to radiate a millimeter wave toward a side face of the electronic devices.

The second antenna module of the electronic devices according to various example embodiments may be disposed to the second housings and overlap the first antenna module based on the screen of the electronic devices being reduced.

The second antenna module of the electronic devices according to various example embodiments may be disposed to the second housings to not overlap with the first antenna module based on the screen of the electronic devices being extended.

The second housings of the electronic devices according to various example embodiments may include a groove provided on a rear face having a specific depth. The second antenna module may be disposed to the groove.

The second antenna module of the electronic devices=according to various example embodiments may be configured to operate based on the screen of the electronic devices being extended.

The second antenna module of the electronic devices according to various example embodiments may be configured to not operate based on the screen of the electronic devices being reduced.

The electronic devices according to various example embodiments may include: first housings, second housings overlapping the first housings based on a screen of the electronic devices being reduced and configured to slide from the first housings based on the screen of the electronic devices being extended, the flexible displays disposed to the first housings and the second housings and having screens configured to be reduced/extended according to the sliding of the second housings, a plurality of first antenna modules including at least one antenna disposed to the first housings and configured to radiate a millimeter wave, and a second antenna module disposed to the second housings overlapping the first housings and configured to radiate a millimeter wave. The second antenna module may be located at an upper end or lower end edge portion of a rear face of the second housings.

The second antenna module of the electronic devices according to various example embodiments may include a plurality of dipole antennas.

In the electronic devices according to various example embodiments, the plurality of dipole antennas may be configured to radiate a millimeter wave toward a side face of the electronic devices.

The plurality of first antenna modules of the electronic devices according to various example embodiments may include the first antenna module disposed to a rear face of the first housings and a third antenna module disposed to a side face of the first housings.

The second antenna module of the electronic devices according to various example embodiments may be disposed to the second housings to be adjacent to or overlap with the third antenna module based on the screen of the electronic devices being reduced.

The second antenna module of the electronic devices according to various example embodiments may be disposed to the second housings spaced apart from the first antenna module based on the screen of the electronic devices being reduced.

The second antenna module of the electronic devices according to various example embodiments may be configured to operate based on the screen of the electronic devices being extended.

The second antenna module of the electronic devices according to various example embodiments may be configured to not operate based on the screen of the electronic devices being reduced.

The electronic devices according to various example embodiments may include: first housings, second housings configured to slide from the first housings, flexible displays disposed to the first housings and the second housings and having screens configured to be reduced/extended according to the sliding of the second housings, a plurality of first antenna modules including at least one antenna disposed to the first housings and configured to radiate a millimeter wave, and a second antenna module including at least one antenna disposed to the second housings overlapping the first housings and configured to radiate a millimeter wave. The second antenna module may include a plurality of dipole antennas configured to radiate a millimeter wave toward a side face of the electronic devices and a plurality of patch antennas configured to radiate a millimeter wave toward a rear face of the electronic devices.

The plurality of first antenna modules of the electronic devices according to various example embodiments may include the first antenna module disposed to a rear face of the first housings and a third antenna module including at least one antenna disposed to a side face of the first housings.

The second antenna module of the electronic devices according to various example embodiments may be disposed to the second housings and overlap the first patch antennas based on the screen of the electronic devices being reduced.

The second antenna module of the electronic devices according to various example embodiments may be disposed to the second housings to not overlap the first patch antennas based on the screen of the electronic devices being reduced.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first housing;

a second housing configured to slide from the first housing between a slide-close state and a slide-open state;

a flexible display disposed at least partially in the first housing and the second housing and comprising a screen configured to be reduced in the slide-close state and extended in the slide-open state according to the sliding of the second housing;

a first antenna module, including at least one antenna, disposed at least partially in the first housing and configured to radiate a millimeter wave; and a second antenna module, including at least one antenna, disposed at last partially in the second housing and configured to radiate a millimeter wave, wherein the second antenna module is located adjacent to a side face of the second housing and is configured to form a beam in a same direction as the first antenna module in both the slide-close state and the slide-open state.

2. The electronic device of claim 1, wherein the first antenna module comprises a plurality of patch antennas, and wherein the second antenna module comprises a plurality of dipole antennas.

3. The electronic device of claim 1, wherein the second antenna module is configured to radiate a millimeter wave toward a side face of the electronic device.

4. The electronic device of claim 1, wherein the second antenna module is disposed in the second housing to overlap with the first antenna module when the screen of the electronic device is reduced.

5. The electronic device of claim 1, wherein the second antenna module is disposed in the second housing to not overlap with the first antenna module when the screen of the electronic device is extended.

6. The electronic device of claim 1, wherein the second housing comprises a groove provided on a rear face and having a specific depth, and wherein the second antenna module is disposed in the groove.

7. The electronic device of claim 1, wherein the second antenna module is configured to operate based on the screen of the electronic device being extended.

8. The electronic device of claim 1, wherein the second antenna module is configured to not operate based on the screen of the electronic device being reduced.

9. The electronic device of claim 1, wherein the second antenna module is disposed in the second housing to not overlap with the first antenna module when the screen of the electronic device is reduced.

10. An electronic device comprising:

a first housing;

a second housing configured to slide from the first housing between a slide-close state and a slide-open state;

a flexible display disposed in the first housing and the second housing and having a screen configured to be reduced in the slide-close state and extended in the slide-open state according to the sliding of the second housing;

a first antenna module at least partially disposed in the first housing and configured to radiate a millimeter wave; and a second antenna module at least partially disposed in the second housing and configured to radiate a millimeter wave, wherein the first antenna module includes at least one antenna configured to radiate millimeter waves towards the rear face of the electronic device in both the slide-close state and the slide-open state, and wherein the second antenna module includes at least one antenna configured to radiate millimeter waves towards the side face or rear face of the electronic device in both the slide-close state and the slide-open state.

11. The electronic device of claim 10, wherein the first antenna module is disposed on a rear face of the first housing, the electronic device further comprising a third antenna module including at least one antenna disposed on a side face of the first housing.

12. The electronic device of claim 11, wherein the second antenna module comprises a plurality of dipole antennas configured to radiate a millimeter wave toward the side face of the electronic device and a plurality of patch antennas configured to radiate a millimeter wave toward the rear face of the electronic device, and wherein the second antenna module is disposed in the second housing with the at least one antenna of the first antenna module at least partially overlapping the patch antennas when the second housing is in the slide-closed state.

13. The electronic device of claim 10, wherein the second antenna module comprises a substrate, a plurality of antennas, a plurality of antenna feeding lines, a radio frequency integrated circuit (RFIC), and a flexible printed circuit board (FPCB), and wherein the substrate is electrically coupled to a first side of the FPCB.

14. The electronic device of claim 13, wherein the RFIC is disposed on a body portion of the FPCB, the body portion being located between the first side and a second side of the FPCB.

15. The electronic device of claim 14, wherein the second side of the FPCB is electrically coupled to a printed circuit board.

16. The electronic device of claim 15, wherein the substrate of the second antenna module comprises a thickness of about 0.2 mm, the RFIC comprises a thickness of about 1.0 mm, and the FPCB comprises a thickness of about 0.15 mm to about 2.0 mm.

* * * * *